United States Patent [19]

Morita et al.

[11] Patent Number: 4,818,807
[45] Date of Patent: Apr. 4, 1989

[54] LIQUID-CRYSTALLINE POLYMER

[75] Inventors: Kazuharu Morita; Shunji Uchida; Satoshi Hachiya, all of Sodegaura, Japan

[73] Assignee: Idemitsu Kosan Co., Ltd., Tokyo, Japan

[21] Appl. No.: 92,612

[22] Filed: Sep. 3, 1987

[30] Foreign Application Priority Data

Sep. 4, 1986 [JP] Japan .................................. 61-206851
Jul. 13, 1987 [JP] Japan .................................. 62-173025
Jul. 20, 1987 [JP] Japan .................................. 62-179139

[51] Int. Cl.$^4$ ............................................. C08G 63/06
[52] U.S. Cl. ................................... 528/191; 528/195; 528/272; 528/288; 528/299
[58] Field of Search ............... 528/191, 195, 272, 288, 528/299

[56] References Cited

U.S. PATENT DOCUMENTS 4,338,431 7/1982 Konig et al. ................... 528/272

Primary Examiner—Maurice J. Welsh
Attorney, Agent, or Firm—Antonelli, Terry & Wands

[57] ABSTRACT

A liquid-crystalline polymer comprising repeating units of the following general formula

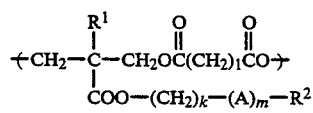

wherein:
R$^1$ is —H, —CH$_3$ or —C$_2$H$_5$,
l is an integer having a value of 1 to 20,
k is an integer having a value of 1 to 30,
A is —O— (oxygen) or —COO—,
m is 0 or 1, and
R$^2$ is

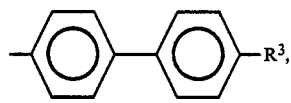

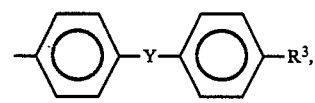

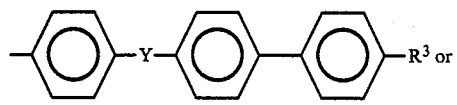

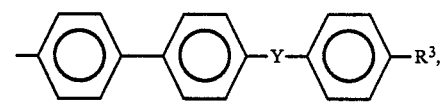

wherein
Y is —COO— or —OCO—, and R$^3$ is —COOR$^4$, —OCOR$^4$, —OR$^4$, —COR$^4$ or —R$^4$ where R$^4$ is

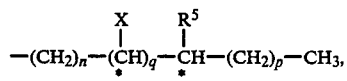

R$^5$ being —CH$_3$, —CN or a halogen radical, n and p being independently an integer having a value of 0 to 10 with the proviso that if R$^5$ is —CH$_3$, p is not 0, X being a halogen radical, q being 0 or 1, and C* being an asymmetric carbon atom.

The liquid-crystalline polymer not only exhibits liquid-crystalline properties and transfers to ferroelectric chiral smectic C phase at temperatures of a wide range including the vicinity of room temperature but also has a high speed in responding to external factors enabling to display motion pictures, and can be advantageously used as display elements of large size screens and curved screens.

14 Claims, No Drawings

LIQUID-CRYSTALLINE POLYMER

BACKGROUND OF THE INVENTION

(1) Industrial Field of the Invention

The present invention relates novel liquid-crystalline polymers. Particularly, the present invention relates to liquid-crystalline polymers which not only exhibit a ferroelectricity even at temperatures in the vicinity of room temperature but also have a high speed in responding to external factors enabling to display motion pictures and can be advantageously used as display elements of large size screens and curved screens. Such liquid-crystalline polymers are useful in optoelectronics fields, especially as electronic optical devices such as display elements for electronic desk calculators, clocks and watches, etc., electronic optical shutters, electronic optical diaphragms, optical modulators, optical-path transfer switches in optical communication systems, memories, liquid crystal printer heads, varifocal lenses, etc.

(2) Description of the Prior Art

Display elements in which low molecular weight liquid crystals are employed have been widely used for digital display of electronic desk calculators, clocks and watches, etc. In these fields of application, such conventional low molecular weight liquid crystals are generally sandwiched between two glass substrates spaced in microns. Such an adjustment of the space however is impossible to applying to large size screens and curved screens. In order to solve the problem, it has been attempted as one way to develop polymeric liquid crystals which per se are moldable (J. Polym. Sci., Polym. Lett., Ed. 13, 243(1975), Polym. Bull., 6, 309 (1982), Japanese Patent Application Laid-open No. 21479/80, etc.).

However, these liquid crystal polymers generally have a disadvantage in low response speed of the changes of transmission intensity and the like to the changes of external factors such as electric field, and therefore no satisfactory liquid crystal polymer has been obtained.

The liquid crystal polymer disclosed in the above-mentioned Japanese Patent laid-open also have a disadvantage in that the polymer itself cannot exhibit liquid-crystalline properties at room temperature and should be heated at temperatures not lower than glass transition temperature and lower than clearing temperature to make it be liquid crystal state.

SUMMARY OF THE INVENTION

The object of the present invention is to solve the problems of the conventional liquid crystal polymers and to provide liquid-crystalline polymers which not only exhibit a ferroelectricity even at temperatures in the vicinity of room temperature but also due to their high response speed to external factors can display motion pictures, and can be advantageously used as display elements of large screens and curved screens.

We have found that this object is achieved by a novel liquid-crystalline polymer comprising repeating units having a specified structure.

The liquid crystalline polymer of the present invention comprises repeating units of the following general formula

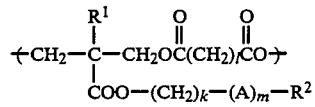

wherein:
$R^1$ is —H, —CH$_3$ or —C$_2$H$_5$,
l is an integer having a value of 1 to 20,
k is an integer having a value of 1 to 30,
A is —O— (oxygen) or —COO—,
m is 0 or 1, and
$R^2$ is

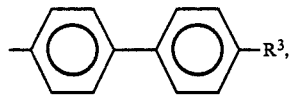

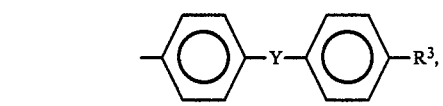

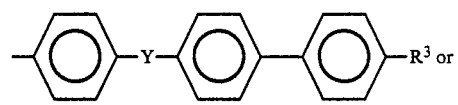

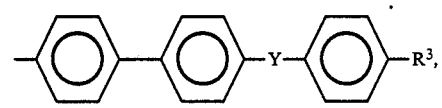

wherein
Y is —COO— or —OCO—, and
$R^3$ is —COOR$^4$, —OCOR$^4$, —OR$^4$, —COR$^4$ or —R$^4$
where
$R^4$ is

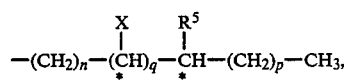

$R^5$ being —CH$_3$, —CN or a halogen radical, n and p being independently an integer having a value of 0 to 10 with the proviso that if $R^5$ is —CH$_3$, p is not 0, X being a halogen radical, q being 0 or 1, and C* being an asymmetric carbon atom.

Among the liquid-crystalline polymers of the present invention, the liquid-crystalline polymers wherein $R^3$ is —OCOR$^4$, $R^4$ is

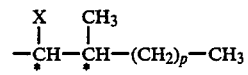

p is an integer having a value of 1 to 10, and X is as defined in the formula(I), the liquid-crystalline polymers wherein $R^3$ is —COOR$^4$, $R^4$ is

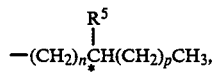

$R^5$ is a halogen radical, n is an integer having a value of 1 to 10, and p is as defined in the formula(I), the liquid-crystalline polymers wherein $R^3$ is —COOR$^4$, $R^4$ is

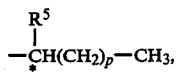

and $R^5$ and p are as defined in the formula(I), the liquid-crystalline polymers wherein $R^3$ is —COOR$^4$, $R^4$ is

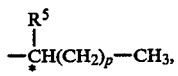

and $R^5$ and p are as defined in the formula(I), and the liquid crystalline polymers wherein $R^3$ is —COOR$^4$, $R^4$ is

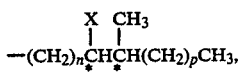

n and p are independently an integer having a value of 1 to 10, and X is as defined in the formula(I) have an especially high spontaneous polarization strength and high response speed to the exchange of electric field.

DETAILED DESCRIPTION OF THE INVENTION

The preferred number average molecular weight of the liquid-crystalline polymers of the present invention is ranging from 2,000 to 400,000. If the number average molecular weight is less than 2,000, there sometimes occurs deterioration of the moldability of the liquid-crystalline polymer into film or coated film. On the other hand, the number average molecular weight larger than 400,000 sometimes produces undesirable results such as the low response speed. The particularly preferred range of the number average molecular weight, which cannot be uniformly specified since it varies depending on the kind of $R^2$, the value of k, the optical purity of $R^4$, etc., is usually 3,000 to 200,000.

In the formula(I), l is preferably an integer having a value of 1 to 3.

In the formula(I), k is preferably an integer having a value of 10 to 12.

In the formula(I), it is preferable that A is —O— and m is 1.

In the formula (I), $R^2$ is preferably

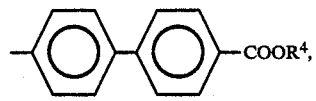

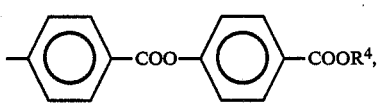

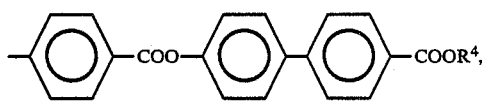

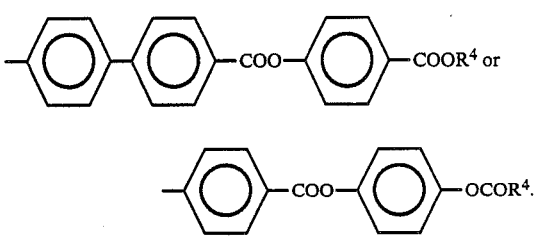

In the formula(I), $R^4$ is preferably

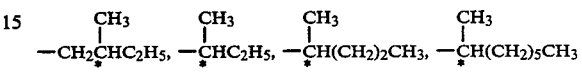

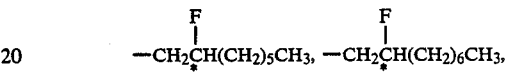

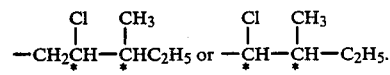

The liquid-crystalline polymers of the present invention comprising the repeating units of the general formula(I) can be classified by the selection of m and A into three types comprising the repeating units of the following general formulas

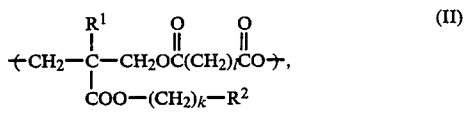  (II)

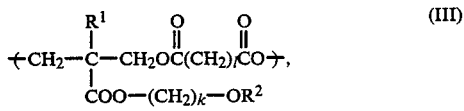  (III)

or

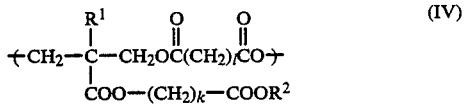  (IV)

wherein $R^1$, $R^2$, l, and k are as defined above.

Hereinafter, the methods of preparing the liquid-crystalline polymers of the present invention comprising the repeating units of the general formula(II), (III) or (IV) will be described.

The liquid-crystalline polymers comprising the repeating units of the general formula(II) may be prepared as shown in the following equation by reacting (V) with (VI) to obtain (VII) followed by condensation polymerization of (VII) and a dicarboxylic acid halide(-VIII).

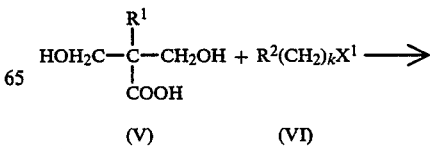

(V)         (VI)

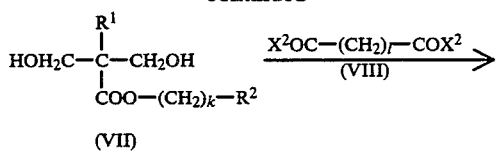

(VII)

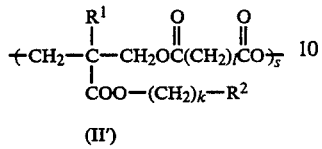

(II')

wherein $X^1$ and $X^2$ are independently a halogen radical, s is polymerization degree, and $R^1$, $R^2$, k, and l are as defined above.

The liquid-crystalline polymers comprising the repeating units of the general formula(III) may be prepared by the way shown in the above equation with the exception that $R^2O(CH_2)_kX^1$ (IX), wherein $R^2$, $X^1$, and k is as defined above, is used in place of the compound(VI).

The liquid-crystalline polymers comprising the repeating units of the general formula(IV) may be prepared by the way shown in the above equation with the exception that $R^2OCO(CH_2)_kX^1$ (X), wherein $R^2$, $X^1$, and k are as defined above, is used in place of the compound(VI).

The preferred liquid-crystalline polymer, from the viewpoint of availability of the raw materials and ease in synthesis, are those comprising the repeating units of the general formula(III).

Some illustrative non-limiting examples of suitable methods of preparing the liquid-crystalline polymers comprising the repeating units of the general formula(III) will be described as follows.

(1) Method of preparing the liquid-crystalline polymers of the general formula(III) wherein $R^2$ is

+ $HOR^4$ ↓

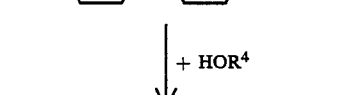

(XI)

(XII)

+ $Br(CH_2)_kBr$ ↓

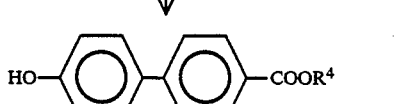

(XIII)

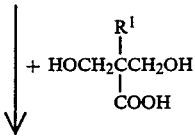

(XIV)

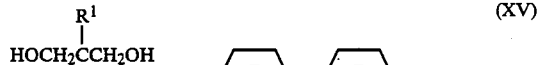

(XV)

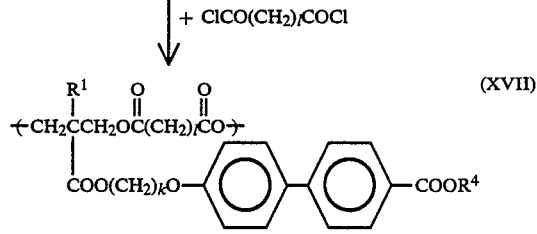

(XVI)

(XVII)

First, as shown in the above equation, 4'-hydroxybiphenyl-4-carboxylic acid is reacted with an optically active alcohol of the formula(XI) in a solvent such as benzene, toluene, chloroform, etc. in the presence of an esterification catalyst such as conc. sulfuric acid, p-toluenesulfonic acid, etc., to form a hydroxyester compound. It is desirable to conduct the reaction with refluxing the solvent to distill water generated in the reaction out of the system.

The obtained hydroxyester compound is then reacted with a linear α,ω-dibromoalkane of the formula(XII) in a solvent such as acetone, etc., in the presence of an alkali such as potassium hydroxide, sodium hydroxide, potassium carbonate, sodium carbonate, etc., at a desired temperature, to form a monobromo compound of the formula(XIII).

The monobromo compound is subsequently reacted with a compound of the formula(XIV) in a solvent such as dimethylformamide, etc., in the presence of an alkali such as tetramethylammonium hydroxide, etc., at a desired temperature, to form a diol compound of the formula(XV).

Finally, the obtained diol compound of the formula(XV) and a dihalide of a dicarboxylic acid of the formula(XVI) are subjected to condensation polymerization in a solvent such as toluene, etc., in the presence of an agent for removing hydrogen chloride such as pyridine, triethylamine, etc. at a desired temperature to form a liquid-crystalline polymer comprising the repeating units of the general formula(XVII)

Further, the liquid-crystalline polymers of the present invention comprising one of the three types of the repeating units, each type being represented by the following general formula, may be prepared by the same way as the above equation with the exception that 4-(4'-hydroxyphenoxycarbonyl)benzoic acid, 4'-(4''-hydroxyphenoxycarbonyl)biphenyl-4-carboxylic acid or 4-[4'-(4''-hydroxyphenyl)phenoxycarbonyl]benzoic acid is used in place of 4'-hydroxybiphenyl-4-carboxylic acid.

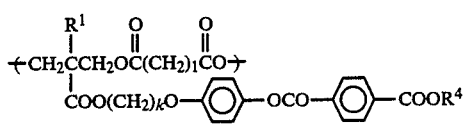

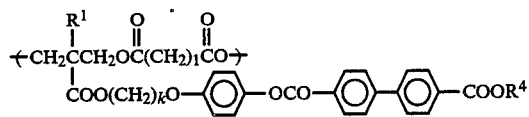

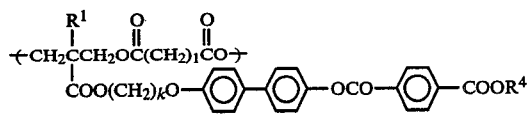

(2) Method of preparing the liquid-crystalline polymers of the present invention comprising the repeating units of the general formula(III) wherein $R^2$ is

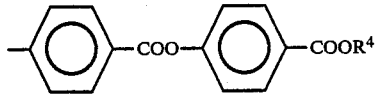

These liquid-crystalline polymers may be prepared by the method of the following equation. Etherification, esterification, condensation polymerization, and the other reactions in the reaction equation may be carried out by the same procedures as those of the method (1).

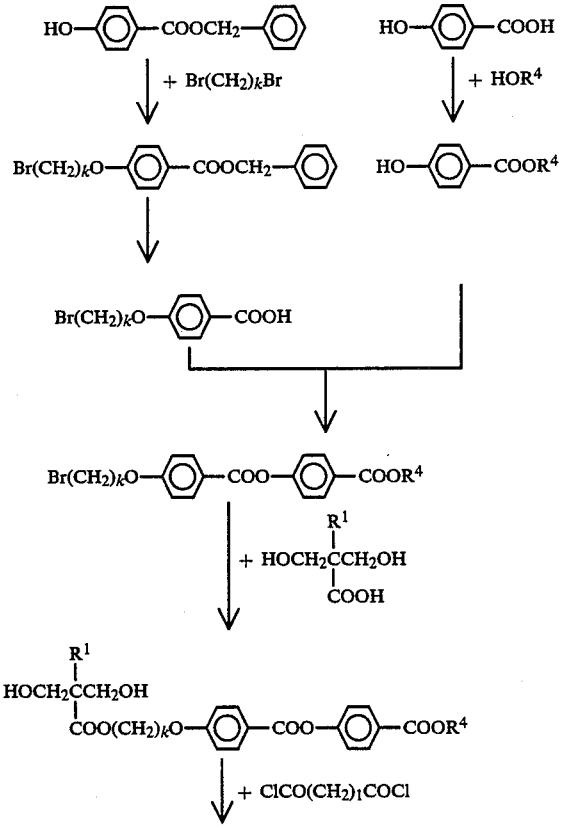

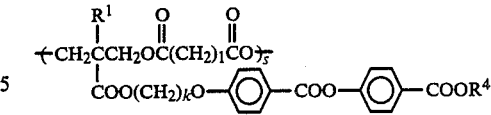

In this method, the carboxyl radical of 4-hydroxybenzoic acid to be used in the etherification with an α,ω-dibromoalkane is protected by esterification with benzyl radical. The hydroxyl radical of 4-hydroxybenzoic acid to be used in the esterification with an optionally active alcohol may also be protected by esterification with acetic acid or the like.

(3) Method of preparing the liquid-crystalline polymers of the present invention comprising the repeating units of the formula(III) wherein $R^2$ is

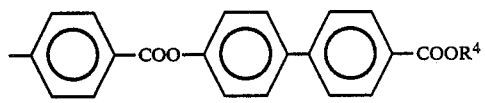

These liquid-crystalline polymers may be prepared by the method(2) with the exception that 4'-hydroxybiphenyl-4-carboxylic acid is used in place of 4-hydroxybenzoic acid.

(4) Method of preparing the liquid-crystalline polymers of the present invention comprising the repeating units of the general formula(III) wherein $R^2$ is

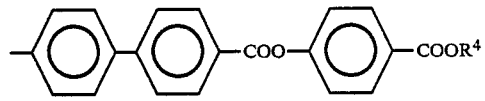

These liquid-crystalline polymers may be prepared by the method(2) with the exception that benzyl 4'-hydroxybiphenyl-4-carboxylate is used in place of benzyl 4-hydroxybenzoate.

(5) Method of preparing the liquid-crystalline polymer of the present invention comprising the repeating units of the general formula(III) wherein $R^2$ is

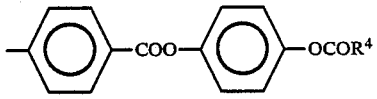

These liquid-crystalline polymers may be prepared by the method(2) with the exception that, in the procedure of forming a hydroxyester compound, the reaction of hydroquinone and an optically active carboxylic acid of the formula $R^4$—COOH (XIX) is carried out in place of the reaction of 4-hydroxybenzoic acid and an optically active alcohol.

Some illustrative examples of the optically active alcohols (XI) to be used for the preparation of the liquid crystalline polymers of the present invention include (R)-2-methylbutanol, (S)-2-methylbutanol, (R)-4-methylhexanol, (S)-4-methylhexanol, (R)-2-chloropropanol, (S)-2-chloropropanol, (R)-2-cyanopropanol, (S)-2-cyanopropanol, (R)-4-chloropentanol, (S)-4-chloropentanol, (R)-2-butanol, (S)-2-butanol, (R)-2-pentanol, (S)-2-pentanol, (R)-2-octanol, (S)-2-octanol, (R)-2-fluorooctanol, (S)-2-fluorooctanol, (R)-2- fluorononanol, (S)-2-fluorononanol, (2S,3S)-2-chloro-3-methyl-1-pentanol, (2S,3S)-2-fluoro-3-methyl-1-pentanol, (2S,3S)-2-bromo-3-methyl-1-pentanol, (3S,4S)-3-chloro-4-methyl-1-hexanol, (4S,5S)-4-chloro-5-methyl-1-heptanol, (5S,6S)-5-chloro-6-methyl-1-octanol, and (6S,7S)-6-chloro-7-methyl-1-nonanol.

The illustrative examples of the optically active carboxylic acids (XIX) to be used for the preparation of the liquid-crystalline polymers of the present invention include (R)-2-methylbutyric acid, (S)-2-methylbutyric acid, (2S,3S)-2-chloro-3-methylvaleric acid, (2S,3S)-2-fluoro-3-methylvaleric acid, (R)-2-methylvaleric acid, (S)-2-methylvaleric acid, (R)-3-methylvaleric acid, (S)-3-methylvaleric acid, (R)-4-methylhexanoic acid, (S)-4-methylhexanoic acid, (R)-2-chloropropionic acid, (S)-2-chloropropionic acid, (R)-6-methyloctanoic acid, (S)-6-methyloctanoic acid, (R)-2-cyanovaleric acid, (S)-2-cyanovaleric acid, (R)-2-cyanopropionic acid, and (S)-2-cyanopropionic acid.

Some illustrative examples of the $\alpha,\omega$-dibromoalkane of the formula (XII) to be used for the preparation of the liquid-crystalline polymers of the present invention include dibromomethane, 1,2-dibromoethane, 1,3-dibromopropane, 1,4-dibromobutane, 1,5-dibromopentane, 1,6-dibromohexane, 1,7-dibromoheptane, 1,8-dibromooctane, 1,9-dibromononane, 1,10-dibromodecane, 1,11-dibromoundecane, 1,12-dibromododecane, 1,13-dibromotridecane, 1,14-dibromotetradecane, 1,19-dibromononadecane, and 1,20-dibromoeicosane.

The definite compounds of the formula (XIV) to be used for the preparation of the liquid-crystalline polymers of the present invention are 2,2-bis(hydroxymethyl)acetic acid, 2,2-bis(hydroxymethyl)propionic acid, and 2,2-bis(hydroxymethyl)butyric acid.

Some illustrative examples of the dicarboxylic acids of the formula (XVI) to be used for the preparation of the liquid-crystalline polymers of the present invention include malonic acid, succinic acid, glutaric acid, adipic acid, pimellic acid, suberic acid, azelaic acid, sebacic acid, decane-1,10-dicarboxylic acid, and dodecane-1,12-dicarboxylic acid.

The liquid-crystalline polymer of the present invention may be used as a film formed by a known film forming technique, for example, casting technique, T-dye technique, inflation technique, calender technique, and stretching technique. The liquid-crystalline polymer in the form of film are usable in various fields of optoelectronics, such as, liquid crystal displays, electronic optical shutters, and electronic optical diaphragms, by sandwiching the film between two large glass substrates, curved glass substrates, polyester films, or the like, not to mentin two usual glass substrates. Also, the liquid-crystalline polymer may be directly formed into a film which is adhered onto a substrate by applying a solution of the liquid-crystalline polymer in a proper solvent to the surface of the substrate followed by evaporating the solvent.

Since the typical property of polymer, i.e. the moldability, and the properties of smectic phase liquid crystals are combined in the liquid-crystalline polymers of the present invention, there is a possibility of many application in the fields of integrated optics, optoelectronics, and information memory. For example, the polymer of the present invention may be used as various kinds of electronic optical devices, such as, liquid crystal displays for digital displays of various forms, electronic optical shutters, electronic optical switches such as optical-path transfer switches in optical communication systems, electronic optical diaphragms, memory elements, optical modulators, printer heads, and varifocal lenses.

Further, in case of necessity, the polymer of the present invention may be improved by various treating methods well known in this industry, such as mixing of polymers of the present invention, mixing with other polymers, addition of additives such as inorganic or organic compounds and metals including a stabilizer, a plastisizer, and the like.

In order to more fully and clearly illustrate the present invention, the following examples are presented. It is intended that the examples be considered as illustrative rather than limiting the invention disclosed and claimed herein.

EXAMPLES 1 TO 16

The structure of the obtained polymers was identified by NMR, IR, and elementary analysis, and the measurement of the phase transition temperature was conducted by the use of a DSC, and the determination of the phase was conducted by the use of a polarizing microscope. The measurements of the electric field response speed and the intensity of spontaneous polarization were conducted as follows.

Measurement of electric field response speed

A liquid-crystalline polymer was disposed between two ITO substrates (20×10 mm) and adjusted to 25 $\mu$m thick by a spacer, and an electric field $E=2\times10^6$ V/m was then applied and the response time of the changes of the transmission intensity (0$\Delta$90%) was measured.

Measurement of spontaneous polarization

A cell was produced by disposing a liquid-crystalline polymer between two ITO substrates (20×10 mm) and adjusting to 10 $\mu$m thick. To the cell was applied a triangular of 0.1 Hz in frequency and 30 V in maximum voltage, and spontaneous polarization was calculated from the measured current of polarization reversal.

In the diagrams illustrating the phase transition behavior, phase states are represented by the following abbreviations. (Cry: crystal state, glass: glass state, S: smectic phase liquid crystal state higher than chiral smectic C phase in order, $S_c^*$: chiral smectic C phase liquid crystal state, $S_A$: smectic A phase liquid crystal state, Iso: isotropic liquid state)

EXAMPLE 1

(1) Preparation of 2-methylbutyl 4'-hydroxybiphenyl-4-carboxylate 93 mmol (20 g) of 4'-hydroxybiphenyl-4-carboxylic acid, 467 mmol (41 g) of (S)-(-)-2-methylbutanol, and 2 ml of conc. sulfuric acid were dissolved in 150 ml of benzene and the mixture was refluxed for 24 hours using a Dean-Stark to carry out esterification reaction. After the conclusion of the reaction, the reaction solution was concentrated and the obtained product was recrystalized from a toluene-hexane solvent mixture to obtain the objective hydroxyester compound having the following structure. (yield: 98%, melting point: 116.2°–117.8° C.)

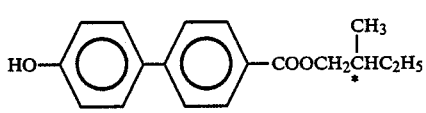

(2) Preparation of 2-methylbutyl 4'-(12-bromododeyloxy)biphenyl-4-carboxylate 70.3 mmol (20 g) of the hydroxyester compound obtained in (1), 0.14 mol (46.2 g) of 1,12-dibromododecane, and 0.28 mol (38.7 g) of potassium carbonate were dissolved in 500 ml of acetone and the solution was refluxed for 4 hours. After the conclusion of the reaction, the reaction solution was filtered and concentrated and the crude product was then purified by column chromatography to obtain the objective monobromo compound having the following structure. (yield: 73%)

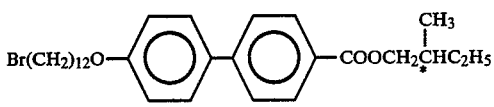

(3) Preparation of 2-methylbutyl 4'-[12-(2,2-bis-hydroxymethylpropionyloxy)dodecyloxy]biphenyl-4-carboxylate 30 mmol (4.0 g) of 2,2-bis(hydroxymethyl)propionic acid and 36 mmol (6.5 g) of tetramethylammonium hydroxide (pentahydrate) were added into 70 ml of DMF (dimethylformamide) and the mixture was stirred for 2 hours. To this was then added 30 mmol (15.9 g) of the monobromo compound obtained in (2) and the mixture was stirred for 6 hours. To the reaction solution was then added 200 ml of water and the mixture was extracted with ether. The extract was concentrated and the obtained product was purified by column chromatography to obtain the objective diol compound having the following structure. (yield: 45%, $[\alpha]_D^{23} = +2.41°$ (CHCl$_3$))

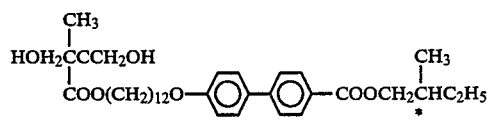

(4) Condensation polymerization 1.7 mmol (1.0 g) of the diol compound obtained in (3) and 5 ml of pyridine were dissolved in 30 ml of toluene and the solution was stirred with maintaining the temperature at −70° C. To this was added 1.7 mmol (0.24 g) of malonyl dichloride dropwise and the mixture was stirred at −70° C. for 12 hours. The reaction solution was then introduced into a large amount of acetone cooled to −70° C. to terminate the condensation polymerization. After the temperature was returned to room temperature, the reaction solution was concentrated, and the resulting crude product was recrystallized from methanol and was then purified by high speed liquid chromatography to obtain a polymer comprising the repeating units of the following formula.

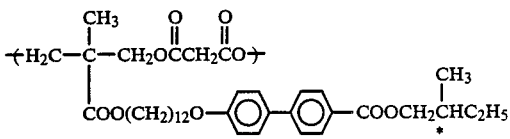

The number average molcular weight Mn (GPC, PS conversion) of the polymer was 5,000.

The phase transition behavior and the response speed to electric field are shown in Table 1.

EXAMPLE 2

The procedure of Example 1 was repeated with the exception that, in (4), 1.7 mmol (0.29 g) of succinyl dichloride was used in place of malonyl dichloride to obtain a polymer comprising the repeating units of the following formula.

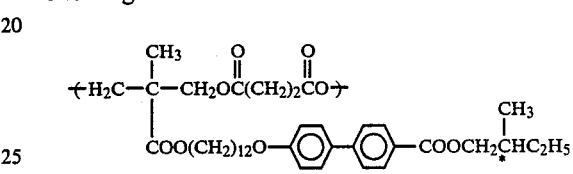

The number average molecular weight Mn (GPC, PS conversion) of the polymer was 5,000.

The phase transition behavior and the response speed to electric field are shown in Table 1.

EXAMPLE 3

The procedure of Example 1 was repeated with the exception that 1.7 mmol (0.29 g) of glutaryl dichloride was used in place of malonyl dichloride to obtain a polymer comprising the repeating units of the following formula.

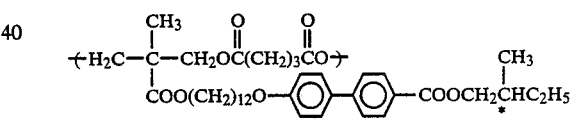

The number average molecular weight Mn (GPC, PS conversion) of the polymer was 4,000.

The phase transition behavior and the response speed to electric field are shown in Table 1.

EXAMPLE 4

(1) Preparation of 2-methylbutyl 4'-hydroxybiphenyl-4-carboxylate

The procedure of Example 1.(1) was repeated to obtain the objective hydroxyester compound of the following formula.

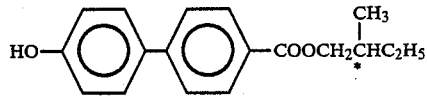

(2) Preparation of 2-methylbutyl 4'-(10-bromodecyloxy)biphenyl-4-carboxylate

A solution of 30 mmol (8.5 g) of the hydroxyester compound obtained in (1), 60 mmol (18.0 g) of 1,10-dibromodecane, and 120 mmol (16.6 g) of potassium carbonate in 400 ml of acetone was refluxed for 6 hours. After the conclusion of the reaction, the reaction solution was filtered and concentrated, and the obtained product was purified by column chromatography to obtain the objective monobromo compound of the following structure. (yield: 88%, [α]$_D^{23}$= +2.44° (CHCl$_3$))

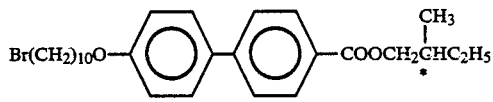

(3) Preparation of 2-methylbutyl 4'-[10-(2,2-bis-hydroxymethylpropionyloxy)decyloxy]-biphenyl-4-carboxylate 18 mmol (2.4 g) of 2,2-bis(hydroxymethyl)propionic acid and 20 mmol (3.6 g) of tetramethylammonium hydroxide (pentahydrate) were stirred for 2 hours in 100 ml of DMF. To the reaction solution was then added 18.0 mmol (9.1 g) of the monobromo compound obtained in (2) and the mixture was stirred for 6 hours. 100 ml of water was then added to the reaction solution and the mixture was extracted with ether. After the extract was dried and concentrated, the obtained crude product was purified by column chromatography to obtain the objective diol compound having the following structure. (yield: 67%, [α]$_D^{23}$= +2.11° (CHCl$_3$))

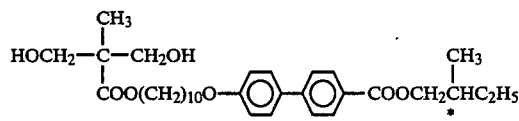

(4) Condensation polymerization

The procedure of the condensation polymerization in Example 1 was repeated with the exception that 1.7 mmol (0.95 g) of the diol compound obtained in (3) was used as a diol compound and 1.7 mmol (0.29 g) of glutaryl dichloride was used as the dicarbonyl dichloride to obtain a polymer comprising the repeating units of the following formula.

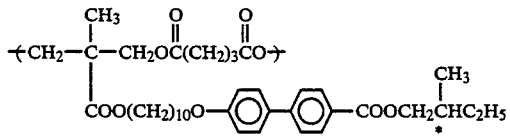

The number average molecular weight Mn (GPC, PS conversion) of the polymer was 4,000.

The phase transition behavior and the response speed to electric field are shown in Table 1.

EXAMPLE 5

(1) Preparation of 2-methylbutyl 4-hydroxybenzoate 90 mmol (12.2 g) of 4-hydroxybenzoic acid and 360 mmol (31.7 g) of 2-methylbutanol were subjected to dehydration in 150 ml of toluene in the presence of 2 ml of conc. sulfuric acid for 25 hours. The reaction solution was then concentrated and was purified by column chromatography to obtain the objective hydroxyester compound of the following formula. ((yield: 95%, [α]$_D^{23}$= +4.85° (CHCl$_3$))

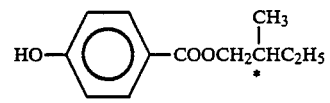

(2) Preparation of benzyl 4-(12-bromododecyloxy)benzoate

A solution of 150 mmol (49.2 g) of 1,12-dibromododecane, 50 mmol (10.6 g) of benzyl 4-hydroxybenzoate, and 0.3 mol (41.5 g) of potassium carbonate in 500 ml of acetone was refluxed for 6 hours. The reaction solution was then filtered and concentrated, and the resulting crude product was purified by column chromatography to obtain the objective ester compound of the following formula. (yield: 82%)

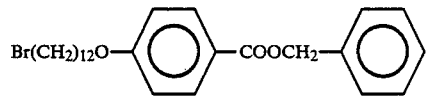

(3) Preparation of 4-(12-bromododecyloxy)benzoic acid

A solution of 100 mmol (47.5 g) of the ester compound obtained in (2) and 2.0 g of palladium carbon (5% catalyst) in 150 ml of ethyl acetate was stirred for 5 hours in the atmosphere of hydrogen gas. The reaction solution was then filtered and concentrated, and the resulting crude product was purified by column chromatography to obtain the objective carboxylic acid derivative of the following formula. (yield: 98%)

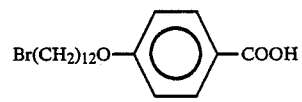

(4) Preparation of 2-methylbutyl 4-[4'-(12-bromododecyloxy)benzoyloxy]benzoate 10 ml of thionyl chloride was added to a solution of 80 mmol (30.8 g) of the carboxylic acid derivative obtained in (3) in 30 ml of toluene and the mixture was stirred for 2 hours at 80° C. After the reaction, the excessive thionyl chloride and toluene were distilled out by vacuum distillation to obtain an acid chloride. A solution of 90 mmol (18.7 g) of the hydroxyester compound obtained in (1) and 100 ml (10.1 g) of triethylamine in 200 ml of tetrahydrofuran was stirred, and to this was added dropwise a THF (tetrahydrofuran) solution of the acid chloride obtained previously and the mixture stirred for 8 hours. After the reaction, the reaction solution was extracted with ether, and the extract was washed with diluted hydrochloric acid, dried, and concentrated. The resulting crude product was purified by column chromatography to obtain the objective monobromo compound of the following formula. (yield: 81%, [α]$_D^{23}$= +2.65° (CHCl$_3$))

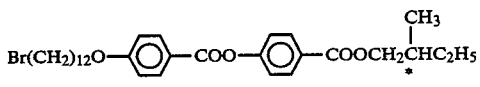

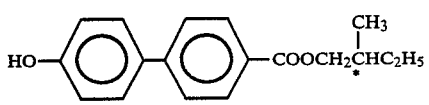

(5) Preparation of 2-methylbutyl 4-[4'-{12-(2,2-bis-hydroxymethylpropionyloxy)-dodecyloxy)benzoyloxy]benzoate 18.0 mmol (2.4 g) of 2,2-bis(hydroxymethyl)propionic acid and 20.0 mmol (3.6 g) of tetramethylammonium hydroxide (pentahydrate) were stirred in 150 ml of DMF for 2 hours. To this was then added 20 mmol (11.5 g) of the monobromo compound obtained in (4) and the mixture was stirred for 6 hours. To the reaction solution was added 200 ml of water and the mixture was extracted with ether. The extract was dried and concentrated, and the resulting crude product was purified by column chromatography to obtain the objective diol compound of the following formula (yield: 58%, $[\alpha]_D^{23} = +2.08°$ (CHCl$_3$))

(2) Preparation of 2-methylbutyl 4'-[4''-(12-bromododecyloxy)benzoyloxy]biphenyl-4-carboxylate 50 mmol (19.3 g) of the carboxylic acid derivative obtained by the method of Example 5.(3) was stirred for 2 hours at 80° C. in 30 ml of toluene and 10 ml of thionyl chloride. The excessive thionyl chloride and toluene were distilled out by vacuum distillation to obtain an acid chloride. A solution of 55 mmol (15.6 g) of the hydroxyester compound obtained in (1) and 60 mmol (6.1 g) of triethylamine in 200 ml of THF was stirred, and to this was added dropwise a THF solution of the acid chloride obtained previously and stirred for 8 hours. After the reaction, the reaction solution was

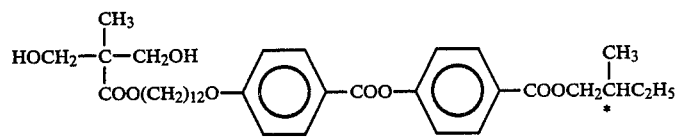

(6) Condensation polymerization

The procedure of the condensation polymerization of Example 1 was repeated with the exception that 1.7 mmol (1.07 g) of the diol compound obtained in (5) was used as a diol compound and 1.7 mmol (0.29 g) of glutaryl dichloride was used as a dicarbonyl dichloride to obtain a polymer comprising the repeating units of the following formula.

extracted with ether and the extract was washed with diluted hydrochloric acid, dried, and concentrated. The resulting crude product was purified by column chromatography to obtain the objective monobromo compound of the following formula. (yield: 73%, $[\alpha]_D^{23} = +2.33°$ (CHCl$_3$))

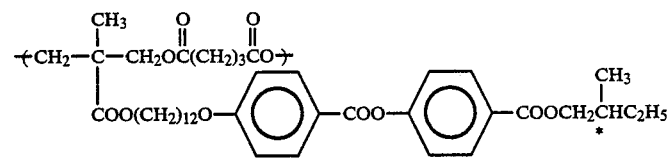

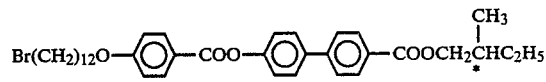

The number average molecular weight of the polymer Mn (GPC, PS conversion) was 5,000.

The phase transition behavior and the response speed to electric field are shown in Table 1.

EXAMPLE 6

(1) Preparation of 2-methylbutyl 4-hydroxybiphenyl-4-carboxylate

The procedure of Example 1.(1) was repeated to obtain the objective hydroxyester compound of the following formula.

(3) Preparation of 2-methylbutyl 4'-[4''-{12-(2,2-bis-hydroxymethylpropionyloxy)-dodecyloxy}benzoyloxy]biphenyl-4-carboxylate 18.0 mmol (2.4 g) of 2,2-bis(hydroxymethylpropionic acid and 20.0 mmol (3.6 g) of tetramethylammonium hydroxide (pentahydrate) were stirred for 2 hours in 150 ml of DMF. To this was then added 18.0 mmol (11.7 g) of the monobromo compound obtained in (2) and the mixture was stirred for 6 hours. After the reaction, the reaction solution was extracted with ether and the extract was dried and concentrated. The resulting crude product was purified by column chromatography to obtain the objective diol compound of the following formula. (yield: 78%, $[\alpha]_D^{23} = +2.10°$ (CHCl$_3$))

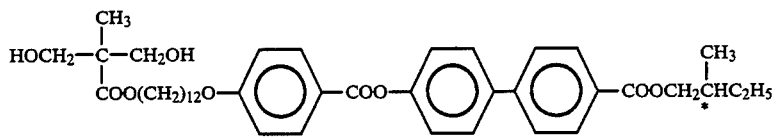

(4) Condensation polymerization

The procedure of the condensation polymerization of Example 1 was repeated with the exception that 1.7 mmol (1.20 g) of the diol compound obtained in (3) was used as a diol compound and 1.7 mmol (0.29 g) of glutaryl dichloride was used as a dicarbonyl dichloride to obtain a polymer comprising the repeating units of the following formula.

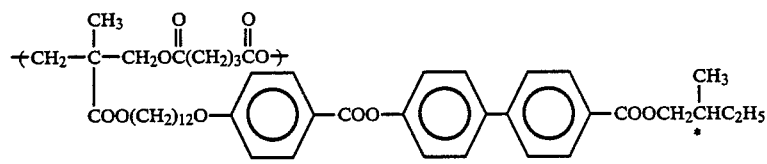

The number average molecular weight Mn (GPC, PS conversion) of the polymer was 4,000.

The phase transition behavior and the response speed to electric field are shown in Table 1.

EXAMPLE 7

(1) Preparation of 2-methylbutyl 4-hydroxybenzoate

The method of Example 5.(1) was repeated to obtain the objective hydroxyester compound of the following formula.

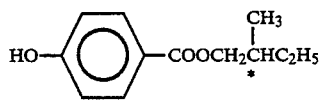

(2) Preparation of benzyl 4'-hydroxybiphenyl-4-carboxylate

A solution of 0.1 mol (21.4 g) of 4'-hydroxybiphenyl-4-carboxylic acid and 0.11 mol (19.9 g) of tetramethylammonium hydroxide (pentahydrate) in 200 ml of DMF was stirred for 2 hours. To this was then added 0.1 mol (17.1 g) of benzyl bromide and the mixture was stirred for 6 hours. After the reaction, the reaction solution was extracted with ether and the extract was dried and concentrated. The resulting crude product was purified by column chromatography to obtain the objective ester compound of the following formula. (yield: 76%)

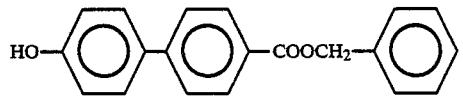

(3) Preparation of benzyl 4'-(12-bromododecyloxy)biphenyl-4-carboxylate

A solution of 70 mmol (21.3 g) of the ester compound obtained in (2), 0.21 mol (68.9 g) of 1,12-dibromododecane, and 0.4 mol (55.3 g) of potassium carbonate in 1 l of acetone was refluxed for 6 hours. After the reaction solution was filtered and concentrated, the resulting crude product was purified by column chromatography to obtain the objective ester compound of the following formula. (yield: 89%)

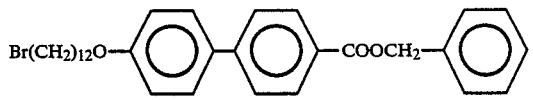

(4) Preparation of 4'-(12-bromododecyloxy)biphenyl-4-carboxylic acid

A solution of 60 mmol (33.1 g) of the ester compound obtained in (3) and 2.0 g of palladium carbon (5% catalyst) in 500 ml of ethyl acetate was stirred for 24 hours in the atmosphere of hydrogen gas. After the reaction, the reaction solution was filtered and concentrated, and the resulting crude product was purified by column chromatography to obtain the objective carboxylic acid derivative of the following formula. (yield: 98%)

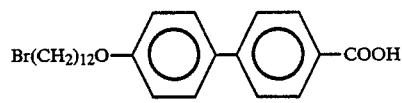

(5) Preparation of 2-methylbutyl 4-[4''-(12-bromododecyloxy)biphenylyl-4'-carbonyloxy]benzoate A solution of 50 mmol (23.1 g) of the carboxylic acid derivative obtained in (4), 10 ml of thionyl chloride, 20 ml of toluene, and 10 ml of chloroform was stirred for 2 hours at 80° C. The excessive thionyl chloride and toluene and chloroform were distilled out by vacuum distillation to obtain an acid chloride. A solution of 55 mmol (14.5 g) of the hydroxyester compound obtained in (1) and 60 mmol (6.1 g) of triethylamine in 200 ml of THF was stirred, and to this was added dropwise a THF solution of the acid chloride and the mixture was reacted for 8 hours. After the reaction, the reaction solution was extracted with ether. The extract was then washed with a diluted hydrochloric acid, dried, and concentrated. The resulting crude product was then purified by column chromatography to obtain the objective monobromo compound of the following formula. (yield: 82%, $[\alpha]_D^{23} = +2.09°$ (CHCl$_3$))

was purified by column chromatography to obtain the objective diol compound of the following formula. (yield: 63%, $[\alpha]_D^{23} = +2.10°$ (CDCl$_3$))

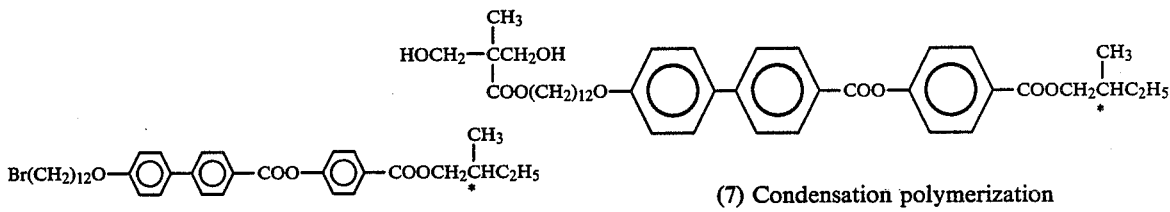

(6) Preparation of 2-methylbutyl 4-[4''-{12-(2,2-bis-hydroxymethylpropionyloxy)-dodecyloxy}biphenyl-4'-carbonyloxy]benzoate 18.0 mmol (2.4 g) of 2,2-bis(hydroxymethyl)propionic acid and 20.0 mmol (3.6 g) of tetramethylammonium hydroxide were stirred in 150 ml of DMF for 2 hours. To this was then added 18.0 mmol (11.7 g) of the monobromo compound obtained in (5) and the mixture was stirred for 6 hours. After the reaction, the reaction solution was extracted with ether and the extract was dried and concentrated. The resulting crude product

(7) Condensation polymerization

The procedure of the condensation polymerization of Example 1 was repeated with the exception that 1.7 mmol (1.20 g) of the diol compound obtained in (6) was used as a diol compound and 1.7 mmol (0.29 g) of glutaryl dichloride was used as a dicarbonyl dichloride to obtain a polymer comprising the repeating units of the following formula.

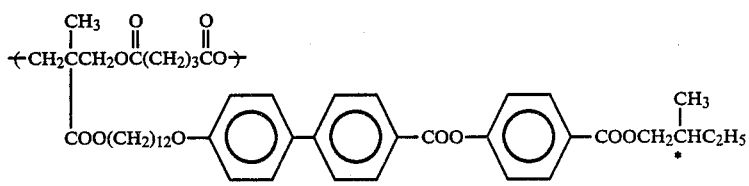

The number average molecular weight Mn (GPC, PS conversion) of the polymer was 4,000

The phase transition behavior and the response speed to electric field of the polymer are shown in Table 1.

TABLE 1

| Example No. | Repeating unit | Phase transition temperature (°C.) | Response time (sec.) | Measuring temp. (°C.) |
|---|---|---|---|---|
| 1 | ![structure with −(H₂C−C(CH₃)−CH₂OCCH₂CO)− and COO(CH₂)₁₂O−biphenyl−COOCH₂*CH(CH₃)C₂H₅] | glass ⇄ −7/−15 S ⇄ −1/−3 S$_C$* ⇄ 27/21 S$_A$ ⇄ 74/72 Iso | 0.04 | 18 |
| 2 | ![structure with −(H₂C−C(CH₃)−CH₂OCCH₂CH₂CO)− and COO(CH₂)₁₂O−biphenyl−COOCH₂*CH(CH₃)C₂H₅] | glass ⇄ −9/−13 S ⇄ 1/0 S$_C$* ⇄ 58/32 S$_A$ ⇄ 73/66 Iso | 0.03 | 29 |
| 3 | ![structure with −(CH₂−C(CH₃)−CH₂OC(CH₂)₃CO)− and COO(CH₂)₁₂O−biphenyl−COOCH₂*CH(CH₃)C₂H₅] | glass ⇄ −15/−16 S ⇄ 2/1 S$_C$* ⇄ 25/22 S$_A$ ⇄ 57/50 Iso | 0.04 | 19 |
| 4 | ![structure with −(CH₂−C(CH₃)−CH₂OC(CH₂)₃CO)− and COO(CH₂)₁₀O−biphenyl−COOCH₂*CH(CH₃)C₂H₅] | glass ⇄ −17/−20 S ⇄ 0/−2 S$_C$* ⇄ 22/18 S$_A$ ⇄ 51/43 Iso | 0.03 | 15 |
| 5 | ![structure with −(CH₂−C(CH₃)−CH₂OC(CH₂)₃CO)− and COO(CH₂)₁₂O−phenyl−COO−phenyl−COOCH₂*CH(CH₃)C₂H₅] | glass ⇄ −30/−30 S ⇄ −6/−6 S$_C$* ⇄ 25/24 S$_A$ ⇄ 34/31 Iso | 0.02 | 21 |
| 6 | ![structure with −(CH₂−C(CH₃)−CH₂OC(CH₂)₃CO)− and COO(CH₂)₁₂O−phenyl−COO−biphenyl−COOCH₂*CH(CH₃)C₂H₅] | glass ⇄ −23/−25 S ⇄ 13/10 S$_C$* ⇄ 117/116 S$_A$ ⇄ 127/123 Iso | 0.02 | 113 |

TABLE 1-continued

| Example No. | Repeating unit | Phase transition temperature (°C.) | Response time (sec.) | Measuring temp. (°C.) |
|---|---|---|---|---|
| 7 | $\mathrm{+CH_2-\underset{\underset{CH_3}{\|}}{C}-\underset{\underset{O}{\|\|}}{C}-CH_2O\underset{\underset{O}{\|\|}}{C}(CH_2)_3CO+}$ <br> $\mathrm{COO(CH_2)_{12}O-}$⟨ring⟩-⟨ring⟩-$\mathrm{COO}$-⟨ring⟩-$\mathrm{COOCH_2\overset{*}{C}HC_2H_5}$ <br> $\underset{CH_3}{\|}$ | glass $\underset{-20}{\overset{-14}{\rightleftarrows}}$ S $\underset{15}{\overset{18}{\rightleftarrows}}$ $S_C^*$ $\underset{92}{\overset{94}{\rightleftarrows}}$ $S_A$ $\underset{107}{\overset{107}{\rightleftarrows}}$ Iso | 0.02 | 89 |

EXAMPLE 8

(1) Preparation of 1-methylpropyl 4-acetoxybenzoate

A solution of 0.12 mol (21.6 g) of 4-acetoxybenzoic acid and 15 ml of thionyl chloride in 70 ml of toluene was stirred for one hour at 80° C., and the reaction solution was then concentrated by distilling the excessive thionyl chloride and toluene by vacuum distillation to obtain an acid chloride. A solution of 0.1 mol (7.4 g) of (S)-(+)-2-butanol and 0.12 mol (12.1 g) of triethylamine in 300 ml of THF was stirred, and to this was added dropwise a THF solution of the acid chloride and the mixture was further stirred for 8 hours. The reaction solution was extracted with ether and the extract was washed with diluted hydrochloric acid, dried, and concentrated. The resulting crude product was purified by column chromatography to obtain 14.2 g of the objective ester compound of the following formula. (yield: 60%, $[\alpha]_D^{23} = +25.0°$ (CHCl$_3$))

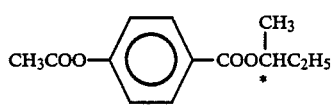

(2) Preparation of 1-methylpropyl 4-hydroxybenzoate 20 ml of benzylamine was added to a solution of 50 mmol (11.8 g) of the ester compound obtained in (1) and the mixture was stirred for 2 hours. The reaction solution was extracted with ether and the extract was dried and concentrated. The resulting crude product was purified by column chromatography to obtain 9.2 g of a hydroxyester compound of the following formula. (yield: 95%, $[\alpha]_D^{23} = +24.7°$ (CHCl$_3$))

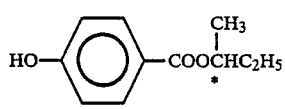

(3) Preparation of 1-methylpropyl 4-[4'-(12-bromododecyloxy)benzoyloxy]benzoate.

10 ml of thionyl chloride was added to a solution of 40 mmol (15.4 g) of the carboxylic acid derivative obtained by the method of Example 5.(3) in 30 ml of toluene and the mixture was stirred for 2 hours at 80° C. After the reaction, the reaction solution was concentrated by distilling the excessive thionyl chloride and the solvent, toluene, by vacuum distillation to obtain an acid chloride. A solution of 40 mmol (7.8 g) of the hydroxyester compound obtained in (2) and 100 mmol (10.1 g) of triethylamine in 200 ml of THF was stirred, and to this was added dropwise a THF solution of the acid chloride and the mixture was further stirred for 8 hours. After the reaction, the reaction solution was extracted with ether and the extract was washed with diluted hydrochloric acid, dried and concentrated. The resulting crude product was purified by column chromatography to obtain 18.0 g of the objective monobromo compound of the following formula. (yield: 80%, $[\alpha]_D^{23} = +4.89°$ (CDCl$_3$))

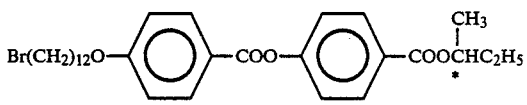

(4) Preparation of 1-methylpropyl 4-[4'-(12-(2,2-bis-hydroxymethylpropionyloxy)-dodecyloxy)benzoyloxy]benzoate 18 mmol (2.4 g) of 2,2-bis(hydroxymethyl)propionic acid and 20 mmol (3.6 g) of tetramethylammonium hydroxide (pentahydrate) was stirred in 150 ml of DMF for 2 hours. To this was then added 18 mmol (10.1 g) of the monobromo compound obtained in (3) and the mixture was stirred for 6 hours. After the reaction, the reaction solution was dried and concentrated. The resulting crude product was purified by column chromatography to obtain 6.6 g of the objective diol compound of the following formula. (yield: 60%, $[\alpha]_D^{23} = +4.44°$ (CHCl$_3$))

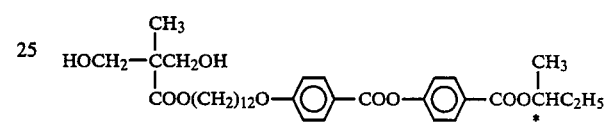

(5) Condensation polymerization

The procedure of the condensation polymerization of Example 1 was repeated with the exception that 1.7 mmol (1.04 g) of the diol compound obtained in (4) was used as a diol compound and 1.7 mmol (0.29 g) of glutaryl dichloride was used as a dicarbonyl dichloride to obtain a polymer comprising the repeating units of the following formula.

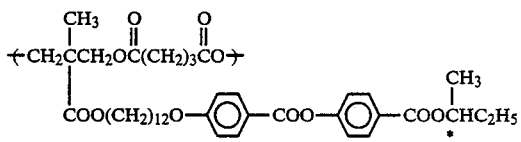

The number average molecular weight of the polymer Mn was 4,000.

The phase transition behavior, the response speed to electric field, and the strength of spontaneous polarization of the polymer are shown in Table 2.

EXAMPLE 9

(1) Preparation of 1-methylbutyl 4-acetoxybenzoate

A solution of 0.12 mol (21.6 g) of 4-acetoxybenzoic acid and 15 ml of thionyl chloride in 70 ml of toluene was stirred at 80° C. The reaction solution was concentrated by distilling the excessive thionyl chloride and the solvent, toluene, by vacuum distillation to obtain an acid chloride. A solution of 0.1 mol (8.8 g) of (L)-(−)-2-pentanol and 0.12 mol (12.1 g) of triethylamine in 300 ml of THF was stirred, and to this was added dropwise a THF solution of the acid chloride and the mixture was further stirred for 8 hours. The reaction solution was extracted with ether and the extract was washed with diluted hydrochloric acid and was dried and concentrated. The resulting crude product was purified by column chromatography to obtain 14.5 g of the objective ester compound of the following formula. (yield: 58%, $[\alpha]_D^{23} = -29.3°$ (CDCl$_3$))

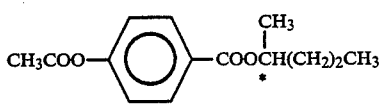

(2) Preparation of 1-methylbutyl 4-hydroxybenzoate 20 ml of benzylamine was added to a solution of 50 mmol (12.5 g) of the ester compound obtained in (1) in 300 ml of ether and the mixture was stirred for 2 hours. The reaction solution ws extracted with ether and the extract was dried and concentrated. The resulting crude product was purified by column chromatography to obtain 9.9 g of the objective hydroxyester compound of the following formula. (yield: 95%, $[\alpha]_D^{23} = -28.5°$ (CHCl$_3$))

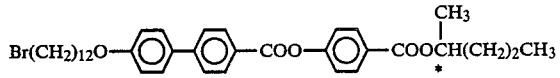

(4) Preparation of 1-methylbutyl 4-[4''-{12-(2,2-bishydroxymethylpropionyloxy)-dodecyloxy}biphenylyl-4'-carbonyloxy]benzoate 18 mmol (2.4 g) of 2,2-bis(hydroxymethyl)propionic acid and 20 mmol (3.6 g) of tetramethylammonium hydroxide (pentahydrate) were stirred in 150 ml of DMF for 2 hours. To this was then added 18 mmol of the monobromo compound obtained in (3) and the mixture was stirred for 6 hours. After the reaction, the reaction solution was extracted with ether and the extract was dried and concentrated. The resulting crude product was purified by column chromatography to obtain 7.4 g of the objective diol compound of the following formula. (yield: 58%, $[\alpha]_D^{23} = -12.8°$ (CHCl$_3$))

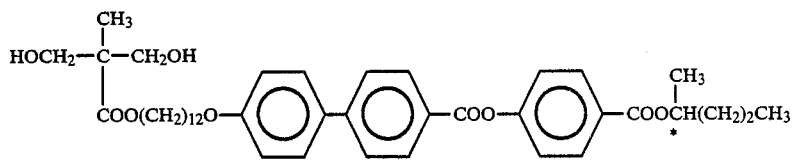

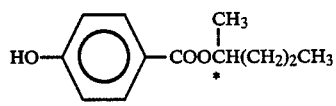

(3) Preparation of 1-methylbutyl 4-[4''-(12-bromododecyloxy)biphenylyl-4'-carbonyloxy]benzoate 10 ml of thionyl chloride and 10 ml of chloroform were added to a solution of 80 mmol (36.9 g) of the carboxylic acid derivative obtained by the method of Example 7.(4) in 30 ml of toluene and the mixture was stirred for 2 hours at 80° C. After the reaction, the reaction solution was concentrated by distilling the excessive thionyl chloride and the solvents, toluene and chloroform, by vacuum distillation to obtain an acid chloride. A solution of 90 mmol (18.7 g) of the hydroxyester compound obtained in (2) and 100 mmol (10.1 g) of triethylamine in 200 ml of THF was stirred, and to this was added dropwise a THF solution of the acid chloride and the mixture was further stirred for 8 hours. After the reaction, the reaction solution was extracted with ether, and the extract was washed with diluted hydrochloric acid, dried, and concentrated. The resulting crude product was purified by column chromatography to obtain 45.4 g of the objective monobromo compound of the following formula. (yield: 87%, $[\alpha]_D^{23} = -13.6°$ (CHCl$_3$))

(5) Condensation polymerization

The procedure of the condensation polymerization of Example 1 was repeated with the exception that 1.7 mmol (1.20 g) of the diol compound obtained in (4) was used as a diol compound and 1.7 mmol (0.29 g) of glutaryl dichloride was used as a dicarbonyl dichloride to obtain 1.02 g of a polymer comprising the repeating units of the following formula. (convert ratio: 75%)

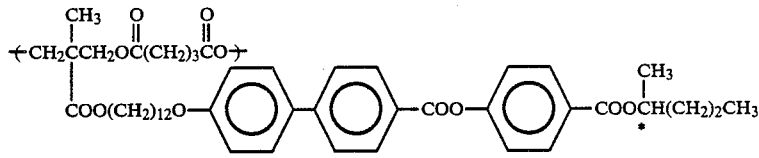

The number average molecular weight of the polymer was 5,000.

The phase transition behavior, the response speed to electric field, and the strength of spontaneous polarization of the polymer are shown in Table 2.

EXAMPLE 10

(1) Preparation of 1-methylheptyl 4-acetoxybenzoate

A solution of 0.12 mol (21.6 g) of 4-acetoxybenzoic acid and 15 ml of thionyl chloride in 70 ml of toluene was stirred at 80° C., and the reaction solution was then concentrated by distilling the excessive thionyl chloride and the solvent, toluene, by vacuum distillation to obtain an acid chloride. A solution of 0.1 mol (14.4 g) of (L)-(−)-2-octanol and 0.12 mol (12.1 g) of triethylamine in 300 ml of THF was stirred, and to this was added dropwise a THF solution of the acid chloride and the mixture was further stirred for 8 hours. The reaction solution was extracted with ether, and the extract was washed with diluted hydrochloric acid, dried, and concentrated. The resulting crude product was purified by column chromatography to obtain 19.3 g of the objective ester compound of the following formula. (yield: 63%, $[\alpha]_D^{23} = -33.1°$ (CHCl$_3$))

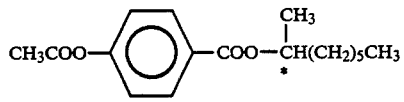

(2) Preparation of 1-methylheptyl 4-hydroxybenzoate 20 ml of benzylamine was added to a solution of 50 mmol) 15.2 g) of the ester compound obtained in (1) in 300 ml of ether and the mixture was stirred for 2 hours. The reaction solution was extracted with ether and the extract was dried and concentrated. The resulting crude product was purified by column chromatography to obtain 12.3 g of the objective hydroxyester compound of the following formula. (yield: 93%, $[\alpha]_D^{23} = -31.0°$ (CHCl$_3$))

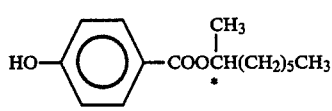

(3) Preparation of 1-methylheptyl 4-[4'-(12-bromododecyloxy)benzoyloxy]benzoate 10 ml of thionyl chloride was added to a solution of 40 mmol (15.4 g) of the carboxylic acid derivative prepared by the method of Example 5.(3) in 30 ml of toluene and the mixture was stirred for 2 hours at 80° C. After the reaction, the reaction solution was concentrated by distilling the excessive thionyl chloride and the solvent, toluene, by vacuum distillation to obtain an acid chloride. A solution of 40 mmol (10.6 g) of the hydroxyester compound obtained in (2) and 100 mmol (10.1 g) of triethylamine in 200 ml of THF was stirred, and to this was dropwise a THF solution of the acid chloride and the mixture was further stirred for 8 hours. After the reaction, the reaction solution was extracted with ether and the extract was washed with diluted hydrochloric acid, dried, and concentrated. The resulting crude product was purified by column chromatography to obtain 19.0 g of the objective monobromo compound of the following formula. (yield: 75%, $[\alpha]_D^{23} = -15.2°$ (CHCl$_3$))

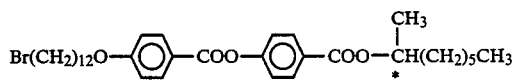

(4) Preparation of 1-methylheptyl 4-[4'-{12-(2,2-bishydroxymethylpropionyloxy)-dodecyloxy}benzoyloxy]benzoate 18 mmol (2.4 g) of 2,2-bis(hydroxymethyl)propionic acid and 20 mmol (3.6 ) of tetramethylammonium hydroxide (pentahydrate) were stirred in 150 ml of DMF for 2 hours. To this was then added 18 mmol (11.4 g) of the monobromo compound obtained in (3) and the mixture was stirred for 6 hours. After the reaction, the reaction solution was extracted with ether and the extract was dried and concentrated. The resulting crude product was purified by column chromatography to obtain 5.3 g of the objective diol compound of the following formula. (yield: 43%, $[\alpha]_D^{23} = -14.2°$ (CHCl$_3$))

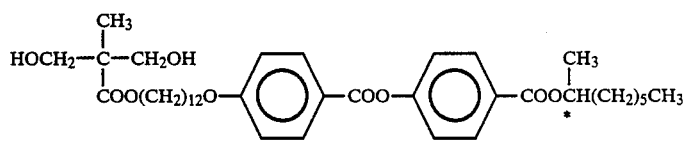

(5) Condensation polymerization

The procedure of the condensation polymerization of Example 1 was repeated with the exception that 1.7 mmol (1.16 g) of the diol compound obtained in (4) was used as a diol compound and 1.7 mmol (0.29 g) of glutaryl dichloride was used as a dicarbonyl dichloride to obtain 0.81 g of a polymer comprising the repeating units of the following formula. (convert ratio: 61%)

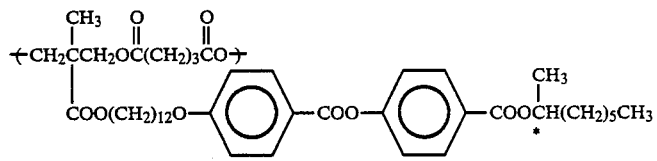

The number average molecular weight of the polymer was 4,000.

The phase transition behavior, the response speed to electric field, and the strength of spontaneous polarization of the polymer are shown in Table 2.

EXAMPLE 11

(1) Preparation of 2-fluorooctyl 4-acetoxybenzoate

A solution of 0.12 mol (21.6 g) of 4-acetoxybenzoic acid and 15 ml of thionyl chloride in 70 ml of toluene was stirred for 1 hour at 80° C. The reaction solution was then concentrated by distilling the excessive thionyl chloride and toluene by vacuum distillation to obtain an acid chloride. A solution of 0.1 mol (14.8 g) of (R)-2-fluorooctanol and 0.12 mol (12.1 g) of triethylamine in 300 ml of THF was stirred, and to this was added dropwise a THF solution of the acid chloride and the mixture was stirred for 8 hours. The reaction solution was extracted with ether, and the extract was washed with diluted hydrochloric acid, dried, and concentrated. The resulting crude product was purified by column chromatography to obtain 19.2 g of the objective ester compound of the following formula. (yield: 62%, $[\alpha]_D^{23} = +7.29°$ (CHCl$_3$))

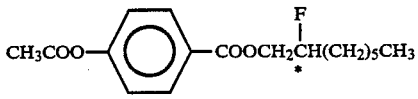

(2) Preparation of 2-fluorooctyl 4-hydroxybenzoate 20 ml of benzylamine was added to a solution of 50 mmol (15.5 g) of the ester compound obtained in (1) in 300 ml of ether and the mixture was stirred for 2 hours. The reaction solution was extracted with ether and the extract was dried and concentrated. The resulting crude product was purified by column chromatography to obtain 13.1 of the objective hydroxyester compound of the following forula. (yield: 98%, $[\alpha]_D^{23} = +6.96°$ (CHCl$_3$))

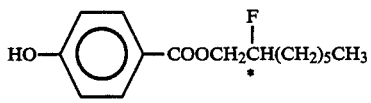

(3) Preparation of 2-fluorooctyl 4-[4'-(12-bromododecyloxy)benzoyloxy]benzoate 10 ml of thionyl chloride was added to a solution of 40 mmol (15.4 g) of the dicarboxylic acid derivative prepared by the method of Example 5.(3) in 30 ml of toluene and the mixture was stirred for 2 hours at 80° C. After the reaction, the reaction solution was concentrated by distilling the excessive thionyl chloride and the solvent, toluene, by vacuum distillation to obtain an acid chloride. A solution of 40 mmol (10.7 g) of the hydroxyester compound obtained in (2) and 100 mmol (10.1 g) of triethylamine in 200 ml of THF was stirred, and to this was added dropwise a THF solution of the acid chloride and the mixture was stirred for 8 hours. After the reaction, the reaction solution was extracted with ether, and the extract was washed with diluted hydrochloric acid, dried, and concentrated. The resulting crude product was purified by column chromatography to obtain 17.8 g of the objective monobromo compound of the following forula. (yield: 70%, $[\alpha]_D^{23} = +2.01°$ (CHCl$_3$))

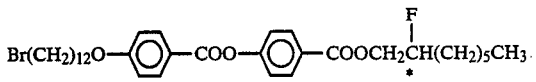

(4) Preparation of 2-fluorooctyl 4-[4'-{12-(2,2-bis-hydroxymethylpropionyloxy)-dodecyloxy}benzoyloxy]benzoate 18 mmol (2.4 g) of 2,2-bis(hydroxymethyl)propionic acid and 20 mmol (3.6 g) of tetramethylammonium hydroxide (pentahydrate) were stirred in 150 ml of DMF for 2 hours. To this was then added 18 mmol (11.4 g) of the monobromo compound obtained in (3) and the mixture was stirred for 6 hours. After the reaction, the reaction solution was extracted with ether, and the extract was dried and concentrated. The resulting crude product was purified by column chromatography to obtain 8.3 g of the objective diol compound of the following formula. (yield: 67%, $[\alpha]_D^{23} = +1.88°$ (CHCl$_3$)

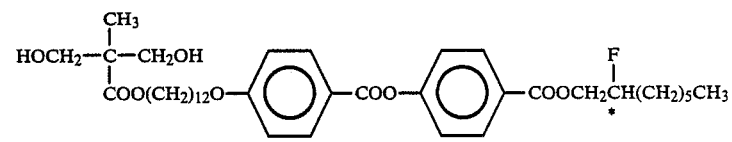

(5) Condensation polymerization

The procedure of the condensation polymerization of Example 1 was repeated with the exception that 1.7 mmol (1.17 g) of the diol compound obtained in (4) was used as a diol compound 1.7 mmol (0.29 g) of glutaryl dichloride was used as a dicarbonyl dichloride to obtain 0.93 g of a polymer comprising the repeating units of the following formula (convert ratio: 70%)

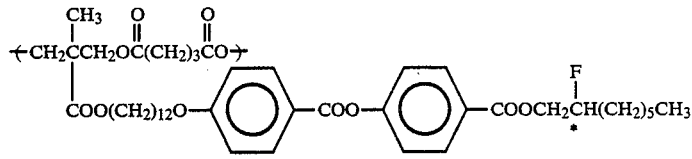

The number average molecular weight of the polymer was 4,000.

The phase transition behavior, the response speed to electric field, and the strength of spontaneous polarization of the polymer are shown in Table 2.

EXAMPLE 12

(1) Preparation of 2-fluorononyl 4-acetoxybenzoate

A solution of 0.12 mol (21.6 g) of 4-acetoxybenzoic acid and 15 ml of thionyl chloride in 70 ml of toluene was stirred at 80° C. The reaction solution was then concentrated by distilling the excessive thionyl chloride and the solvent, toluene, by vacuum distillation to obtain an acid chloride. A solution of 0.1 mol (16.2 g) of (R)-2-fluorononanol and 0.12 mol (12.1 g) of triethylamine in 300 ml of THF was stirred, and to this was added dropwise a THF solution of the acid chloride and the mixture was further stirred for 8 hours. The reaction solution was then extracted with ether, and the extract was washed with diluted hydrochloric acid and was dried and concentrated. The resulting crude product was purified by column chromatography to obtain 19.1 g of the objective ester compound of the following formula. (yield: 59%, $[\alpha]_D^{23} = +5.91°$ (CHCl₃))

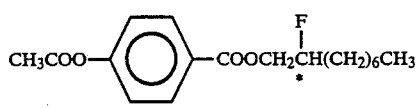

(2) Preparation of 2-fluorononyl 4-hydroxybenzoate 20 ml of benzylamine was added to a solution of 50 mmol (16.2 g) of the ester compound obtained in (1) in 300 ml of ether and the mixture was stirred for 2 hours. The reaction solution was extracted with ether, and the extract was dried and concentrated. The resulting crude product was purified by column chromatography to obtain 13.7 g of the objective hydroxyester compound of the following formula. (yield: 97%, $[\alpha]_D^{23} = +5.43°$ (CHCl₃))

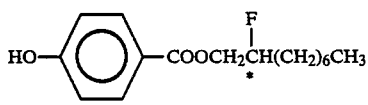

(3) Preparation of 2-fluorononyl 4-[4'-(12-bromododecyloxy)benzoyloxy]benzoate 10 ml of thionyl chloride and 10 ml of chloroform were added to a solution of 40 mmol (15.4 g) of the carboxylic acid derivative prepared by the method of Example 5.(3) in 30 ml of toluene and the mixture was stirred at 80° C. for 2 hours. After the reaction, the reaction solution was concentrated by distilling the excessive thionyl chloride and the solvents, toluene and chloroform, by vacuum distillation to obtain an acid chloride. A solution of 40 mmol (11.3 g) of the hydroxyester compound obtained in (2) and 100 mmol (10.1 g) of triethylamine in 200 ml of THF was stirred, and to this was added dropwise a THF solution of the acid chloride and the mixture was further stirred for 8 hours. After the reaction, the reaction solution was extracted with ether and the extract was washed with diluted hydrochloric acid, dried, and concentrated. The resulting crude product was purified by column chromatography to obtain 17.4 g of the objective monobromo compound of the following formula. (yield: 67%, $[\alpha]_D^{23} = +1.77°$ (CHCl₃))

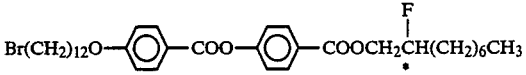

(4) Preparation of 2-fluorononyl 4-[4'-{12-(2,2-bis-hydroxymethylpropionyloxy)-dodecyloxy}benzoyloxy]benzoate 18 mmol (2.4 g) of 2,2-bis(hydroxymethyl)propionic acid and 20 mmol (3.6 g) of tetramethylammonium hydroxide (pentahydrate) were stirred in 150 ml of DMF for 2 hours. To this was then added 18 mmol (11.7 g) of the monobromo compound obtained in (3) and the mixture was stirred for 6 hours. After the reaction, the reaction solution was extracted with ether, and the extract was dried and concentrated. The resulting crude product was purified by column chromatography to obtain 9.7 g of the objective diol compound of the following formula. (yield: 77%, $[\alpha]_D^{23} = +1.53°$ (CHCl₃))

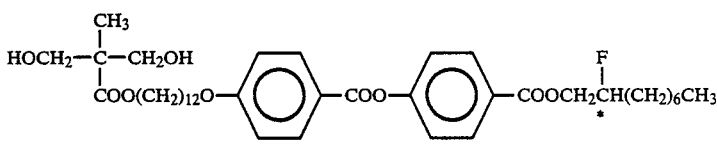

(5) Condensation polymerization

The procedure of the condensation polymerization of Example 1 was repeated with the exception that 1.7 mmol (1.19 g) of the diol compound obtained in (4) was used as a diol compound and 1.7 mmol (0.29 g) of glutaryl dichloride was used as a dicarbonyl dichloride to obtain 0.77 g of polymer comprising the repeating units of the following formula. (convert ratio: 57%)

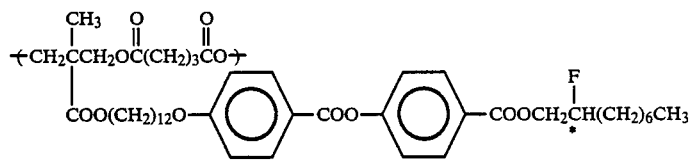

The number average molecular weight of the polymer was 4,500.

The phase transition behavior, response speed to electric field, and strength of spontaneous polarization of the polymer are shown in Table 2.

EXAMPLE 13

(1) Preparation of 4-hydroxyphenyl 2-methylbutyrate

A solution of 0.15 mol (16.1 g) of hydroquinone, 0.24 mol (24.6 g) of (S)-(+)-2-methylbutyric acid, and 1 ml of conc. sulfuric acid in 500 ml of toluene was refluxed for 24 hours using a Dean-Stark. The reaction solution was concentrated and purified by column chromatography to obtain 23.8 g of the objective hydroxyester compound of the following formula. (yield: 83%, $[\alpha]_D^{23} = +19.5°$ (CHCl₃))

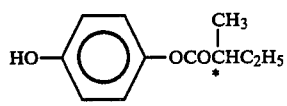

(2) Preparation of 4-[4'-(12-bromododecyloxy)benzoyloxy]phenyl 2-methylbutyrate 10 ml of thionyl chloride was added to a solution of 40 mmol (15.4 g) of the carboxylic acid derivative prepared by the method of Example 5.(3) in 30 ml of toluene and the mixture was stirred for 2 hours at 80° C. After the reaction, the reaction solution was concentrated by distilling the excessive thionyl chloride and the solvent, toluene, by vacuum distillation to obtain an acid chloride. A solution of 40 mmol (7.7 g) of the hydroxyester compound obtained in (1) and 100 mmol (10.1 g) of triethylamine in 200 ml of THF was stirred, and to this was added dropwise a THF solution of the acid chloride and the mixture was further stirred for 8 hours. After the reaction, the reaction solution was extracted with ether, and the extract was washed with diluted hydrochloric acid, dried, and concentrated. The resulting crude product was purified by column chromatography to obtain 16.1 g of the objective monobromo compound of the following formula. (yield: 72%, $[\alpha]_D^{23} = +3.66°$ (CHCl$_3$))

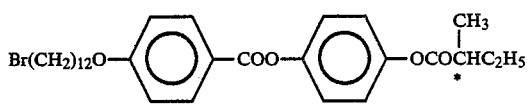

(3) Preparation of 4-[4'-{12-(2,2-bis-hydroxymethylpropionyloxy)-dodecyloxy}benzoyloxy]phenyl 2-methylbutyrate 18 mmol (2.4 g) of 2,2-bis(hydroxymethyl)propionic acid and 20 mmol (3.6 g) of tetramethylammonium hydroxide (pentahydrate) were stirred in 150 ml of DMF for 2 hours. To this was added 18 mmol (10.1 g) of the monobromo compound obtained in (2) and the mixture was stirred for 6 hours. After the reaction, the reaction solution was extracted with ether, and the extract was dried and concentrated. The resulting crude product was purified by column chromatography to obtain 5.9 g of the objective diol compound of the following formula: (yield: 54%, $[\alpha]_D^{23} = +3.03°$ (CHCl$_3$))

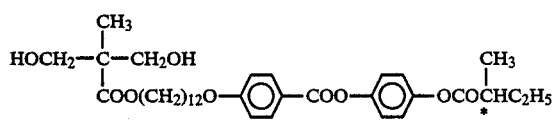

(4) Condensation polymerization

The procedure of the condensation polymerization of Example 1 was repeated with the exception that 1.7 mmol (1.04 g) of the diol compound obtained in (3) was used as a diol compound and 1.7 mmol (0.29 g) of glutaryl dichloride was used as a dicarbonyl dichloride to obtain 0.81 g of a polymer comprising the repeating units of the following formula. (convert ratio: 67%)

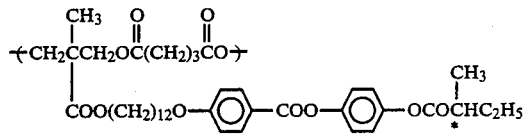

The number average molecular weight of the polymer was 3,500.

The phase transition behavior, response speed to electric field, and strength of spontaneous polarization of the polymer are shown in Table 2.

EXAMPLE 14

(1) Preparation of 2-chloro-3-methylpentyl 4-acetoxybenzoate

A solution of 0.12 mol (21.6 g) of 4-acetoxybenzoic acid and 15 ml of thionyl chloride in 70 ml of toluene was stirred at 80° C. The reaction solution was then concentrated by distilling the excessive thionyl chloride and the solvent, toluene, by vacuum distillation to obtain an acid chloride. A solution of 0.1 mol (13.6 g) of (2S,3S)-2-chloro-3-methyl-1-pentanol and 0.12 mol (12.1 g) of triethylamine in 300 ml of THF was stirred, and to this was added dropwise a THF solution of the acid chloride and the mixture was further stirred for 8 hours. The reaction solution was extracted with ether, and the extract was washed with diluted hydrochloric acid, dried, and concentrated. The resulting crude product was purified by column chromatography to obtain 16.4 g of the objective ester compound of the following formula. (yield: 55%, $[\alpha]_D^{23} = +22.3°$ (CHCl$_3$))

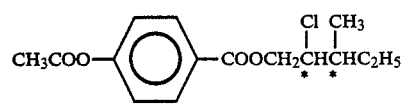

(2) Preparation of 2-chloro-3-methylpentyl 4-hydroxybenzoate 20 ml of benzylamine was added to a solution of 50 mmol (14.9 g) of the ester compound obtained in (1) in 300 ml of ether with stirring and the mixture was stirred for 2 hours. The reaction solution was extracted with ether and the extract was dried and concentrated. The resulting crude product was purified by column chromatography to obtain 12.2 g of the objective hydroxyester compound of the following formula. (yield: 95%, $[\alpha]_D^{23} = +21.0°$ (CHCl$_3$))

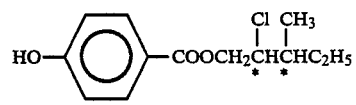

(3) Preparation of 2-chloro-3-methylpentyl 4-[4'-(12-bromododecyloxy)benzoyloxy]benzoate 10 ml of thionyl chloride was added to a solution of 80 mmol (29.5 g) of the carboxylic acid derivative prepared by the method of Example 5. (3) in 30 ml of toluene and the mixture was stirred for 2 hour at 80° C. After the reaction, the reaction solution was concentrated by distilling the excessive thionyl chloride and the solvent, toluene, by vacuum distillation to obtain an acid chloride. A solution of 90 mmol (23.1 g) of the hydroxyester compound obtained in (2) and 100 mmol (10.1 g) of triethylamine in 200 ml of THF was stirred, and to this was added dropwise a THF solution of the acid chloride and the mixture was further stirred for 8 hours. After the reaction, the reaction solution was extracted with ether, and the extract was washed with diluted hydrochloric acid, dried, and concentrated. The resulting crude product was purified by column chromatography to obtain 39.4 g of the objective monobromo compound of the following formula. (yield: 81%, $[\alpha]_D^{23} = +5.90°$ (CHCl$_3$))

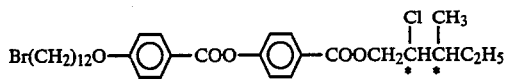

(4) Preparation of 2-chloro-3-methylpentyl 4-[4'-{12-(2,2-bis-hydroxymethylpropionyloxy)-dodecyloxy}benzoyloxy]benzoate 18.0 g mmol (2.4 g) of 2,2-bis(hydroxymethyl)propionic acid and 20.0 mmol (3.6 g) of tetramethylammonium hydroxide (pentahydrate) were stirred in 150 ml of DMF for 2 hours. To this was then added 18 mmol (11.0 g) of the monobromo compound obtained in (3) and the mixture was stirred for 6 hours. After the reaction, the reaction solution was extracted with ether and the extract was dried and concentrated. The resulting crude product was purified by column chromatography to obtain 7.4 g of the objective diol compound of the following formula. (yield: 62%, $[\alpha]_D^{23} = +5.11°$ (CHCl$_3$))

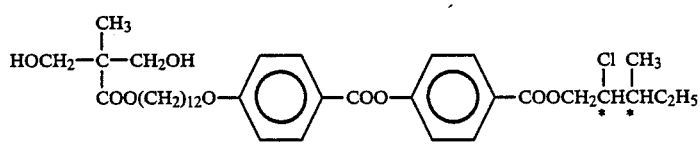

(5) Condensation polymerization 1.7 mmol (0.29 g) of glutaryl dichloride was added to a solution of 1.7 mmol (1.13 g) of the diol compound obtained in (4) and 5 mmol (0.5 g) of triethylamine in 2 ml of THF, and the mixture was stirred for 12 hours. Subsequently, the temperature was raised to 80° C. and the mixture was then further stirred for 2 hours. The reaction solution was then introduced into a large amount of acetone to terminate the condensation polymerization. The resulting solution was concentrated and was purified by high speed liquid chromatography to obtain a polymer comprising the repeating units of the following formula.

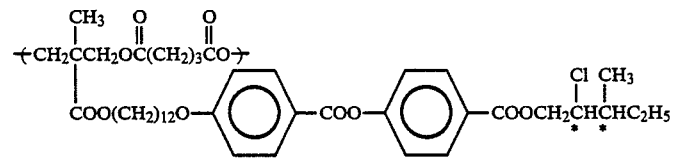

The number average molecular weight Mn (GPC, PS conversion) of the polymer was 5,000.

The phase transition behavior, response speed to electric field, and strength of spontaneous polarization of the polymer are shown in Table 2.

EXAMPLE 15

(1) Preparation of benzyl 4'-hydroxybiphenyl-4-carboxylate

A solution of 0.1 mol (21.4 g) of 4'-hydroxybiphenyl-4-carboxylic acid and 0.11 mol (19.9 g) of tetramethylammonium hydroxide (pentahydrate) in 200 ml of DMF was stirred for 2 hours. To this was then added 0.1 mol (17.1 g) of benzyl bromide and the mixture was stirred for 6 hours. The reaction solution was extracted with ether and the extract was dried and concentrated. The resulting crude product was purified by column chromatography to obtain 23.1 g of the objective ester compound of the following formula. (yield: 76%)

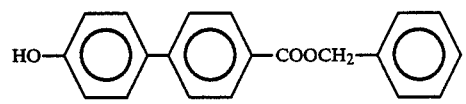

(2) Preparation of benzyl 4'-(12-bromododecyloxy)biphenyl-4-carboxylate

A solution of 70 mmol (21.3 g) of the ester compound obtained in (1), 0.21 mmol (68.9 g) of 1,12-dibromododecane, and 0.4 mol (55.3 g) of potassium carbonate in 1 l of acetone was refluxed for 6 hours. The reaction solution was filtered and concentrated, and the resulting crude product was purified by column chromatography to obtain 34.4 g of the objective ester compound of the following formula. (yield: 89%)

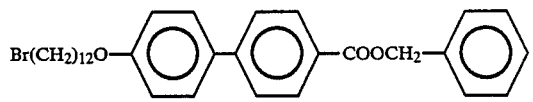

(3) Preparation of 4'-(12-bromododecyloxy)biphenyl-4-carboxylic acid

A solution of 60 mmol (33.1 g) of the ester compound obtained in (2) and 2.0 g of palladium carbon (5% catalyst) in 500 ml of ethyl acetate was stirred for 24 hours in the atmosphere of hydrogen gas. After the reaction, the reaction solution was filtered and concentrated and the resulting crude product was then purified by column chromatography to obtain 27.1 g of the objective carboxylic acid derivative of the following formula. (yield: 98%)

compound of the following formula. (yield: 80%, $[\alpha]_D^{23} = +4.92°$ (CHCl₃))

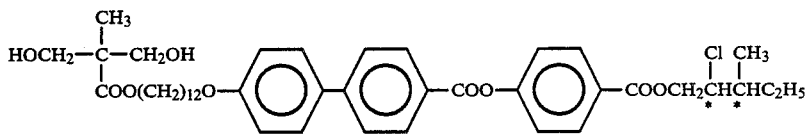

(6) Condensation polymerization

The procedure of the condensation polymerization of Example 14 was repeated with the exception that 1.7 mmol (1.28 g) of the diol compound obtained in (5) was used as a diol compound to obtain a polymer comprising the repeating units of the following formula.

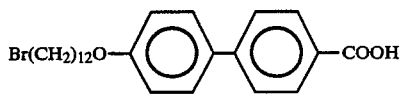

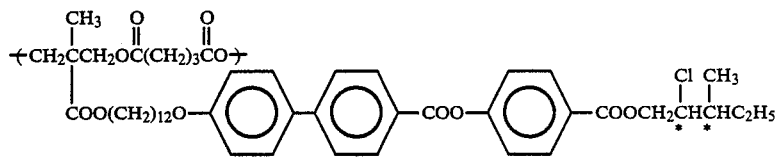

(4) Preparation of 2-chloro-3-methylpentyl 4-[4''-(12-bromododecyloxy)biphenylyl-4'-carbonyloxy]benzoate A solution comprising 50 mmol (23.1 g) of the carboxylic acid derivative obtained in (3), 20 ml of toluene, 10 ml of chloroform, and 10 ml of thionyl chloride was stirred for 2 hours at 80° C. The excessive thionyl chloride and the solvents, toluene and chloroform, were distilled out by vacuum distillation to obtain an acid chloride. A solution of 55 mmol (14.1 g) of the hydroxyester compound prepared by the method of Example 1.(2) and 60 mmol (6.1 g) of triethylamine in 200 ml of THF was stirred, and to this was added dropwise a THF solution of the acid chloride and the mixture was further stirred for 8 hours. The reaction solution was extracted with ether, and the extract was washed with diluted hydrochloric acid, dried, and concentrated. The resulting crude product was purified by column chromatography to obtain 28.7 g of the objective monobromo compound of the following formula. (yield: 82%, $[\alpha]_D^{23} = +5.11°$ (CHCl₃))

The number average molecular weight Mn (GPC, PS conversion) of the polymer was 5,000.

The phase transition behavior, response speed to electric field, and strength of spontaneous polarization of the polymer are shown in Table 2.

EXAMPLE 16

(1) Preparation of 4-hydroxyphenyl 2-chloro-3-methylvalerate

A solution of 0.1 mol (10.7 g) of hydroquinone, 0.18 mol (24.2 g) of (2S,3S)-2-chloro-3-methylvaleric acid, and 1 ml of conc. sulfuric acid in 500 ml of toluene was refluxed for 24 hours using a Dean-Stark. The reaction solution was concentrated and purified by column chromatography to obtain 15.7 g of the objective hydroxyester compound of the following formula. (yield: 70%, $[\alpha]_D^{23} = +1.52°$ (CHCl₃))

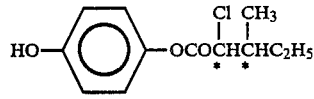

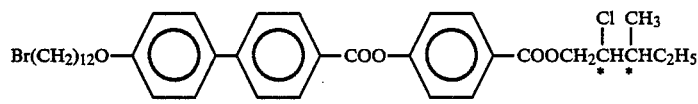

(5) Preparation of 2-chloro-3-methylpentyl 4-[4''-{12-(2,2-bis-hydroxymethylpropionyloxy)-dodecyloxy}biphenylyl-4'-carbonyloxy]benzoate A solution of 18.0 mmol (2.4 g) 2,2-bis(hydroxymethyl)propionic acid and 20.0 mmol (3.6 g) of tetramethylammonium hydroxide (pentahydrate) in 150 ml of DMF was stirred for 2 hours. To this was then added 18 mmol (12.6 g) of the monobromo compound obtained in (4) and the mixture was stirred for 6 hours. After the reaction, the reaction solution was extracted with ether and the extract was dried and concentrated. The resulting crude product was purified by column chromatography to obtain 10.8 g of the objective diol (2) Preparation of 4-[4'-(12-bromododecyloxy)benzoyloxy]phenyl 2-chloro-3-methylvalerate 10 ml of thionyl chloride was added to a solution of 40 mmol (15.4 g) of the carboxylic acid derivative prepared by the method of Example 5.(3) in 30 ml of toluene and the mixture was stirred for 2 hours at 80° C. After the reaction, the reaction solution was concentrated by distilling the excessive thionyl chloride and the solvent, toluene, out by vacuum distillation to obtain an acid chloride. A solution of 40 mmol (9.0 g) of the hydroxyester compound obtained in (1) and 100 mmol (10.1 g) of triethylamine in 200 ml of THF was stirred, and to this was added dropwise a THF solution of the acid chloride and the mixture was further stirred for 8 hours. After the reaction, the reaction solution was extracted with ether, and the extract was washed with diluted hydrochloric acid and was dried and concentrated. The resulting crude product was purified by column chromatography to obtain 18.0 of the objective monobromo compound of the following formula. (yield: 76%, $[\alpha]_D^{23} = +1.40°$ (CHCl$_3$))

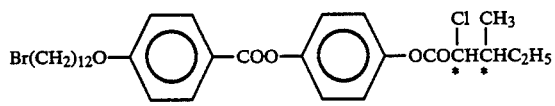

(3) Preparation of 4-[4'-{12-(2,2-bis-hydroxymethylpropionyloxy)-dodecyloxy}benzoyloxy]phenyl 2-chloro-3-methylvalerate 18 mmol (2.4 g) of 2,2-bis(hydroxymethyl)propionic acid and 20 mmol (3.6 g) of tetramethylammonium hydroxide (pentahydrate) were stirred in 150 ml of THF for 2 hours. To this was then added 18 mmol (10.6 g) of the monobromo compound obtained in (2) and the mixture was stirred for 6 hours. After the reaction, the reaction solution was extracted with ether, and the extract was dried and concentrated. The resulting crude product was purified by column chromatography to obtain 9.0 g of the objective diol compound of the following formula. (yield: 78%, $[\alpha]_D^{23} = +1.24°$ (CHCl$_3$))

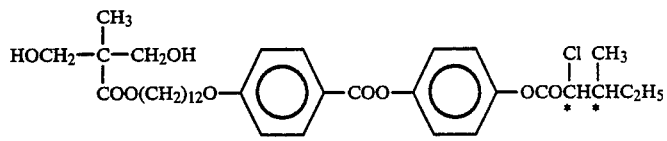

(4) Condensation polymerization

The procedure of the condensation polymerization of Example 1 was repeated with the exception that 1.7 mmol (1.10 g) of the diol compound obtained in (3) was used as a diol compound and 1.7 mmol (0.29 g) of glutaryl dichloride was used as a dicarbonyl dichloride to obtain 0.97 g of a polymer comprising the repeating units of the following formula. (convert ratio: 77%)

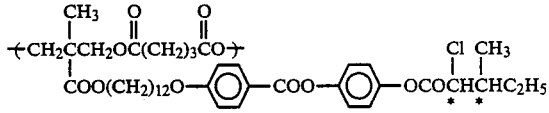

The number average molecular weight of the polymer was 3,000.

The phase transition behavior, response speed, and strength of spontanous polarization of the polymer are shown in Table 2.

TABLE 2

| Example No. | Repeating unit | Phase transition temperature (°C.) | Response time (sec.) | Measuring temp. (°C.) | Spontaneous polarization strength (nc/cm$^2$) |
|---|---|---|---|---|---|
| 8 | $+CH_2CCH_2OC(CH_2)_3CO+$ with $CH_3$, $O=$, $COO(CH_2)_{12}O$–⟨phenyl⟩–$COO$–⟨phenyl⟩–$COOCH(CH_3)^*COOCH_2CH_3$ | glass $\underset{-25}{\overset{-23}{\rightleftarrows}}$ S$_c^*$ $\underset{-22}{\overset{-20}{\rightleftarrows}}$ Iso | 0.001 | −23 | 40 |
| 9 | $+CH_2CCH_2OC(CH_2)_3CO+$ with $CH_3$, $O=$, $COO(CH_2)_{12}O$–⟨phenyl⟩–⟨phenyl⟩–$COO$–⟨phenyl⟩–$COOCH(CH_3)^*COOCH(CH_2)_2CH_3$ | glass $\underset{-24}{\overset{-21}{\rightleftarrows}}$ S $\underset{19}{\overset{22}{\rightleftarrows}}$ S$_c^*$ $\underset{93}{\overset{96}{\rightleftarrows}}$ Iso | 0.001 | 90 | 43 |
| 10 | $+CH_2CCH_2OC(CH_2)_3CO+$ with $CH_3$, $O=$, $COO(CH_2)_{12}O$–⟨phenyl⟩–$COO$–⟨phenyl⟩–$COO$–$CH(CH_3)^*(CH_2)_5CH_3$ | glass $\underset{-36}{\overset{-33}{\rightleftarrows}}$ S$_c^*$ $\underset{-20}{\overset{-17}{\rightleftarrows}}$ Iso | 0.002 | −22 | 42 |
| 11 | $+CH_2CCH_2OC(CH_2)_3CO+$ with $CH_3$, $O=$, $COO(CH_2)_{12}O$–⟨phenyl⟩–$COO$–⟨phenyl⟩–$COOCH^*(F)(CH_2)_5CH_3$ (via $CH_2$) | glass $\underset{-15}{\overset{-13}{\rightleftarrows}}$ S $\underset{-1}{\overset{0}{\rightleftarrows}}$ S$_c^*$ $\underset{28}{\overset{32}{\rightleftarrows}}$ Iso | 0.0007 | 25 | 73 |
| 12 | $+CH_2CCH_2OC(CH_2)_3CO+$ with $CH_3$, $O=$, $COO(CH_2)_{12}O$–⟨phenyl⟩–$COO$–⟨phenyl⟩–$COOCH^*(F)(CH_2)_6CH_3$ (via $CH_2$) | glass $\underset{-13}{\overset{-11}{\rightleftarrows}}$ S $\underset{0}{\overset{3}{\rightleftarrows}}$ S$_c^*$ $\underset{26}{\overset{27}{\rightleftarrows}}$ Iso | 0.0008 | 23 | 75 |
| 13 | $+CH_2CCH_2OC(CH_2)_3CO+$ with $CH_3$, $O=$, $COO(CH_2)_{12}O$–⟨phenyl⟩–$COO$–⟨phenyl⟩–$OCOCH(CH_3)^*CH_2CH_5$ | glass $\underset{-20}{\overset{-17}{\rightleftarrows}}$ S $\underset{-3}{\overset{-1}{\rightleftarrows}}$ S$_c^*$ $\underset{7}{\overset{10}{\rightleftarrows}}$ Iso | 0.005 | −5 | 30 |

TABLE 2-continued

| Example No. | Repeating unit | Phase transition temperature (°C.) | Response time (sec.) | Measuring temp. (°C.) | Spontaneous polarization strength (nc/cm²) |
|---|---|---|---|---|---|
| 14 | +CH₂CCH₂OC(CH₂)₃CO+ with CH₃, O, O groups; —COO(CH₂)₁₂O—⟨phenyl⟩—COO—⟨phenyl⟩—COOCH₂CHCHC₂H₅ with Cl CH₃ * * | glass $\underset{-28}{\overset{-25}{\rightleftarrows}}$ S $\underset{-13}{\overset{-10}{\rightleftarrows}}$ S$_c$* $\underset{4}{\overset{7}{\rightleftarrows}}$ S$_A$ $\underset{12}{\overset{22}{\rightleftarrows}}$ Iso | 0.01 | 2 | 50 |
| 15 | +CH₂CCH₂OC(CH₂)₃CO+ with CH₃, O, O groups; —COO(CH₂)₁₂O—⟨phenyl⟩—COO—⟨phenyl⟩—⟨phenyl⟩—COOCH₂CHCHC₂H₅ with Cl CH₃ * * | Cry $\underset{7}{\overset{7}{\rightleftarrows}}$ S$_c$* $\underset{110}{\overset{115}{\rightleftarrows}}$ Iso | 0.01 | 100 | 58 |
| 16 | +CH₂CCH₂OC(CH₂)₃CO+ with CH₃, O, O groups; —COO(CH₂)₁₂O—⟨phenyl⟩—COO—⟨phenyl⟩—OCOCH—CHC₂H₅ with Cl CH₃ * * | glass $\underset{-30}{\overset{-28}{\rightleftarrows}}$ S$_c$* $\underset{-25}{\overset{-23}{\rightleftarrows}}$ S$_A$ $\underset{51}{\overset{57}{\rightleftarrows}}$ Iso | 0.0005 | −26 | 214 |

What is claimed is:

1. A liquid-crystalline polymer comprising repeating units of the following general formula

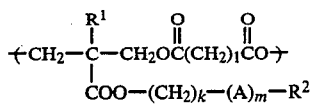

wherein:
R$^1$ is —H, —CH$_3$ or —C$_2$H$_5$,
l is an integer having a value of 1 to 20,
k is an integer having a value of 1 to 30,
A is —O— (oxygen) or —COO—,
m is 0 or 1, and
R$^2$ is

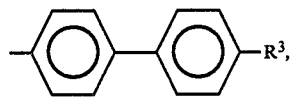

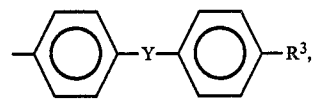

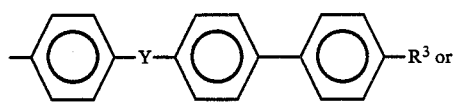

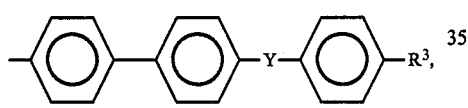

wherein
Y is —COO— or —OCO—,
and R$^3$ is —COOR$^4$, —OCOR$^4$, —OR$^4$, —COR$^4$ or —R$^4$ where
R$^4$ is

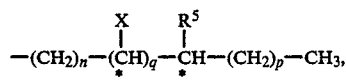

R$^5$ being —CH$_3$, —CN or a halogen radical, n and p being independently an integer having a value of 0 to 10 with the proviso that if R$^5$ is —CH$_3$, p is not 0, X being a halogen radical, q being 0 or 1, and C* being an asymmetric carbon atom.

2. The liquid crystalline polymer of claim 1 wherein R$^5$ is —CH$_3$, —Cl or —CN, and q is 0.

3. The liquid crystalline polymer of claim 1 wherein R$^5$ —CH$_3$, n is an integer having a value of 0 to 5, q is 1, and p is an integer having a value of 1 to 5.

4. The liquid-crystalline polymer of claim 1, wherein the number average molecular weight is 3,000 to 200,000.

5. The liquid-crystalline polymer of claim 1, wherein l is an integer having a value of 1 to 3, and k is an integer having a value of 10 to 12.

6. The liquid-crystalline polymer of claim 5, wherein A is —O— (oxygen), and R$^2$ is

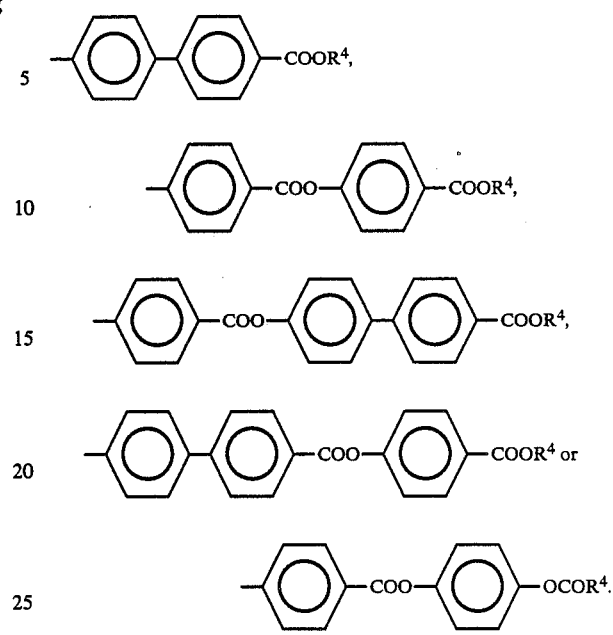

7. The liquid-crystalline polymer of claim 6, wherein R$^4$ is

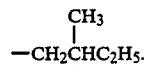

8. The liquid-crystalline polymer of claim 6, wherein R$^4$ is

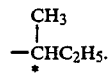

9. The liquid-crystalline polymer of claim 6, wherein R$^4$ is

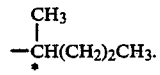

10. The liquid-crystalline polymer of claim 6, wherein R$^4$ is

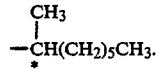

11. The liquid-crystalline polymer of claim 6, wherein R$^4$ is

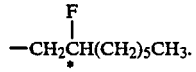

12. The liquid-crystalline polymer of claim 6, wherein R$^4$ is

13. The liquid-crystalline polymer of claim 6, wherein R4 is
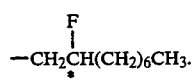
14. The liquid-crystalline polymer of claim 6, wherein R⁴ is
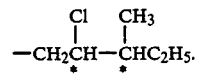
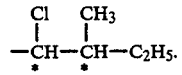
* * * * *